United States Patent
Maheshwari et al.

(10) Patent No.: US 10,512,057 B1
(45) Date of Patent: Dec. 17, 2019

(54) POSITIONING OF A MOBILE DEVICE USING AN ENHANCED EXCHANGE OF CAPABILITIES

(71) Applicant: QUALCOMM Incorporated, San Diego, CA (US)

(72) Inventors: Ankit Maheshwari, Hyderabad (IN); Stephen William Edge, Escondido, CA (US); Rimal Patel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/052,387

(22) Filed: Aug. 1, 2018

(51) Int. Cl.
| | |
|---|---|
| *H04W 64/00* | (2009.01) |
| *H04W 24/10* | (2009.01) |
| *H04W 16/32* | (2009.01) |
| *H04W 16/18* | (2009.01) |

(52) U.S. Cl.
CPC .......... *H04W 64/00* (2013.01); *H04W 16/18* (2013.01); *H04W 16/32* (2013.01); *H04W 24/10* (2013.01)

(58) Field of Classification Search
CPC .... G01S 5/0054; G01S 5/0018; G01S 5/0045; G01S 5/0036; H04L 67/18; H04W 4/02; H04W 64/006; H04W 64/00; H04W 24/10; H04W 4/025; H04W 64/003; H04W 84/005
See application file for complete search history.

(56) References Cited

U.S. PATENT DOCUMENTS

| | | | |
|---|---|---|---|
| 6,999,762 B2 * | 2/2006 | Uchida | H04W 8/245 455/432.1 |
| 8,483,722 B2 | 7/2013 | Kim et al. | |
| 9,507,012 B2 | 11/2016 | Brassil et al. | |
| 9,629,117 B2 | 4/2017 | Bajko et al. | |
| 2009/0181698 A1 * | 7/2009 | Farmer | H04W 4/02 455/456.3 |
| 2011/0098057 A1 * | 4/2011 | Edge | G01S 5/0018 455/456.1 |

(Continued)

OTHER PUBLICATIONS

Fischer S., "Introduction to OTDOA on LTE Networks", Qualcomm Technologies, Inc., Aug. 7, 2014, pp. 1-18.

(Continued)

*Primary Examiner* — Nizar N Sivji
(74) *Attorney, Agent, or Firm* — Silicon Valley Patent Group LLP

(57) ABSTRACT

Apparatuses and methods for user equipment (UE) positioning are disclosed based on a coverage enhancement level or internal signaling delay for the UE. In one embodiment, a method at a UE may include receiving a request capabilities message from a server, determining one or more capabilities of the UE, where the one or more capabilities include at least one of information for at least one internal signaling path of the UE or information for a coverage enhancement level of the UE, sending a first response message to the server, where the first response message includes the one or more capabilities of the UE, receiving a request for location measurements from the server based at least in part on the one or more capabilities of the UE, obtaining the location measurements, and sending a second response message to the server, where the second response message comprises the location measurements.

37 Claims, 15 Drawing Sheets

(56) References Cited

U.S. PATENT DOCUMENTS

| | | | | |
|---|---|---|---|---|
| 2011/0212733 | A1* | 9/2011 | Edge | G01S 5/0036 |
| | | | | 455/456.1 |
| 2012/0040687 | A1* | 2/2012 | Siomina | G01S 5/0205 |
| | | | | 455/456.1 |
| 2012/0258733 | A1* | 10/2012 | Fischer | H04W 4/20 |
| | | | | 455/456.1 |
| 2018/0063763 | A1* | 3/2018 | Gupta | H04W 16/08 |
| 2018/0249359 | A1* | 8/2018 | Woods | H04W 4/02 |
| 2019/0103149 | A1* | 4/2019 | Hasbun | G06F 12/0284 |

OTHER PUBLICATIONS

Thorpe M., et al., "LTE Location Based Services Technology Introduction White Paper Table of Contents OA Rohde & Schwarz LTE Location Based Services—Technology Introduction 2", Sep. 2013, 23 Pages, XP055192328, Retrieved from the Internet: URL: http://www.rohde-schwarz.de/file/LTE_L.

* cited by examiner

POSITIONING OF A MOBILE DEVICE USING AN ENHANCED EXCHANGE OF CAPABILITIES

FIELD

The present disclosure relates to the field of mobile communications. In particular, the present disclosure relates to apparatuses and methods for supporting positioning of a mobile device using an enhanced exchange of capabilities.

BACKGROUND

In existing mobile devices, different implementations can have varying radio frequency front-end designs with varying numbers of components. These variations in design can produce different internal delays in a Radio Frequency (RF) receiver path. This internal delay can impact the accuracy of timing measurements obtained by a mobile device to support positioning of the mobile device. For example, measurements of a Reference Signal Time Difference (RSTD) to support Observed Time Difference of Arrival (OTDOA) positioning may have reduced accuracy due to differences in RF internal delays for the different signals being measured in the case of, for example, inter-frequency signals.

In addition, coverage enhancement (CE) has been introduced by the Third Generation Partnership Project (3GPP) for Long Term Evolution (LTE) wireless access to provide extended wireless coverage to mobile devices in remote locations/basements etc. With CE, improved RF sensitivity is achieved via added repetitions of transmission on both uplink and downlink. Hence, in scenarios where a mobile device attempts to obtain location measurements (e.g. RSTD measurements) in CE mode, the number of repetitions may impact (e.g. increase) the time taken for the mobile device to complete and send back the measurement results to a location server such as an Enhanced Serving Mobile Location Center (E-SMLC). This extra delay may result in a failure to locate the mobile device—e.g. if the overall delay in obtaining measurement results from a mobile device exceeds the required time to obtain a position for the mobile device.

Therefore, it would be desirable to improve the accuracy of positioning to mitigate or overcome the above effects.

SUMMARY

According to aspects of the present disclosure, a UE can be configured to share details of the current CE Level and an estimate of UE internal delay via either the LPP Provide Capabilities (PC) message or the LPP Provide Location Information (PLI) message to the E-SMLC (or SUPL SLP). The E-SMLC can measure the round trip time (RTT) for the exchange of LPP Request Capabilities (RC) and PC messages or the RTT for exchange of LPP Request Location Information (RLI) and PLI messages. The UE can include in the LPP PC or LPP PLI the internal UE delay between receiving the RC or RLI message, respectively, and send the PC or RLI message. Subtracting internal UE delay from the measured RTT can give the RTT for the message transmission part including the effects of CE mode and receive chain delay. This approach enables the E-SMLC to better estimate the capability of the UE to obtain and return RSTD measurements within certain required response time.

According to aspects of the present disclosure, a UE may be configured to provide the E-SMLC with internal delay information per receive chain, the receive chain tag for a neighbor cell PRS measurement and the CE coverage level for the UE in an LPP PC or LPP PLI. The internal UE delay may include the time taken when a PRS signal is received from the UE antenna until the signal is available internally for baseband processing and measurement. This delay can be characterized and pre-stored in a look up table. Knowledge of this delay can be used to accurately measure an RTT between the E-SMLC and UE. For example, when returning an LPP Provide Capabilities message, a UE may include the internal UE delay which the E-SMLC can subtract to estimate RTT.

Embodiments of apparatuses and methods for enhanced device capability exchange in mobile positioning applications are disclosed. In one embodiment, a method of positioning by a mobile device may include receiving by a transceiver of the mobile device a request capabilities message from a server, determining by a processor of the mobile device one or more capabilities of the mobile device, where the one or more capabilities of the mobile device include at least one of information for at least one internal signaling path of the mobile device or information for a coverage enhancement level of the mobile device, sending by the transceiver a first response message to the server, where the first response message includes the one or more capabilities of the mobile device, receiving by the transceiver a request for location measurements from the server based at least in part on the one or more capabilities of the mobile device, obtaining by the transceiver and the processor the location measurements, and sending by the transceiver a second response message to the server, where the second response message comprises the location measurements.

According to aspects of the present disclosure, the one or more capabilities of the mobile device include the information for the coverage enhancement level, where the request for location measurements is further based at least in part on the information for the coverage enhancement level. The information for the at least one internal signaling path comprises an internal delay of the at least one internal signaling path. The information for the coverage enhancement level may include at least one of a transmission power level for the mobile device, a number of repetitions of a message broadcast by a serving base station and received and successfully decoded by the mobile device, a number of repetitions of a message sent by the mobile device to the serving base station, the message acknowledged by the serving base station, or some combinations thereof. The location measurements may include measurements of a reference signal time difference for Observed Time Difference of Arrival (OTDOA) positioning. The mobile device communicates with the server using Narrow Band Internet of Things (NB-IoT) wireless access. The server is an Enhanced Serving Mobile Location Center (E-SMLC), a Secure User Plane Location (SUPL) Location Platform (SLP), or a Location Management Function (LMF).

In some implementations, the method may further include determining the internal delay of the at least one internal signaling path based on at least one of a type of antenna, a transceiver, a power amplifier or an antenna switch used by the at least one internal signaling path. The method may further include determining a first response delay between a time of receiving the request capabilities message and a time of sending the first response message, where the information for the coverage enhancement level comprises the first response delay. The server may be configured to determine a coverage enhancement level for the mobile device based on a difference between the first response delay and a second response delay, where the server measures the second response delay, and where the second response delay comprises a difference between a time of sending the request capabilities message at the server and a time of receiving the first response message at the server.

According to aspects of the present disclosure, determining the information for the coverage enhancement level may include receiving first repetitions of a signal, the signal broadcast by a serving base station, the first repetitions based on a first coverage enhancement level, determining whether the first repetitions of the signal are successfully decoded, and including the first coverage enhancement level in the information for the coverage enhancement level when the first repetitions of the signal are successfully decoded.

Determining the information for the coverage enhancement level may further include in response to the first repetitions of the signal not being successfully decoded, receiving second repetitions of the signal, the second repetitions based on a second coverage enhancement level, the second repetitions including the first repetitions, determining whether the second repetitions of the signal are successfully decoded, and including the second coverage enhancement level in the information for the coverage enhancement level when the second repetitions of the signal are successfully decoded.

The method of positioning by a mobile device may further include receiving by the transceiver assistance data from the server based at least in part on the one or more capabilities of the mobile device, and obtaining by the transceiver and the processor the location measurements, based at least in part on the assistance data.

In another embodiment, a device may include a transceiver configured to receive a request capabilities message from a server, a processor configured to determine one or more capabilities of the mobile device, where the one or more capabilities of the mobile device include at least one of information for at least one internal signaling path of the mobile device or information for a coverage enhancement level of the mobile device, the transceiver is further configured to send a first response message to the server, where the first response message includes the one or more capabilities of the mobile device, and receive a request for location measurements from the server based at least in part on the one or more capabilities of the mobile device, the processor is further configured to obtain the location measurements; and the transceiver is further configured to send a second response message to the server, where the second response message comprises the location measurements.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used to indicate like elements throughout the figures.

DESCRIPTION OF EMBODIMENTS

Embodiments of apparatuses and methods for enhanced device capability exchange for mobile positioning applications are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

According to aspects of the present disclosure, the terms device, mobile device, wireless device, terminal, mobile terminal and user equipment (UE) may be used interchangeably without altering the scope of the disclosure. For instance, a device to device communication may refer to communication between two UEs. A mobile device or UE refers to a mobile station such as a cellular or other wireless communication device, personal communication system (PCS) device, personal navigation device, Personal Information Manager (PIM), Personal Digital Assistant (PDA), cellphone, smartphone, laptop, tablet, tracking device or other suitable mobile device which is capable of sending and receiving wireless communications. The term "mobile device" or "UE" is also intended to include devices which communicate with a personal navigation device (PND), such as by short-range wireless, infrared, wireline connection, or other connection, regardless of whether satellite signal reception, assistance data reception, and/or position-related processing occur at the device or at the PND. Also, a "mobile device" or "UE" may include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered as a "mobile device" or "UE".

Figure 1:
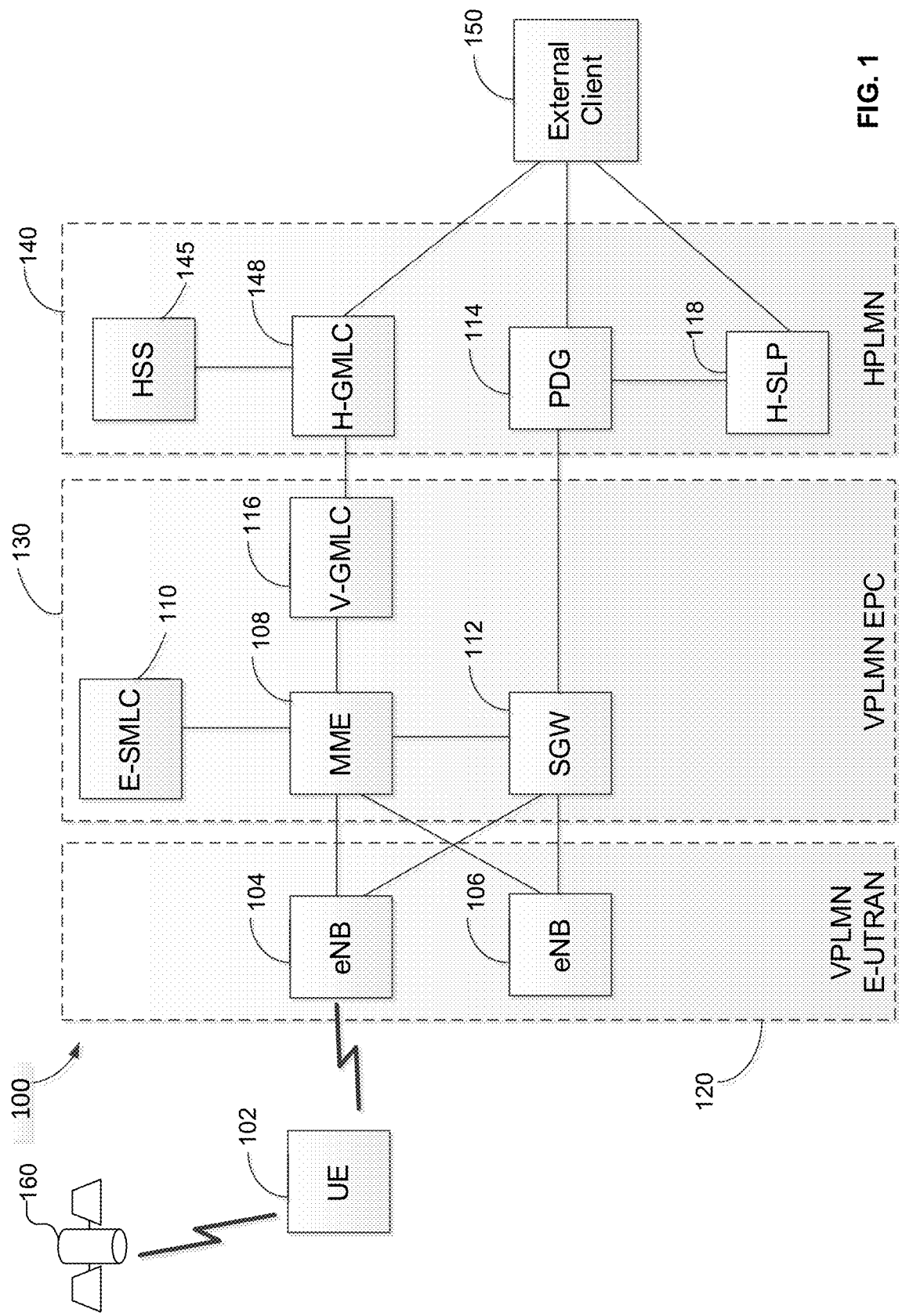
FIG. 1 illustrates an exemplary network architecture for location support of a user equipment (UE) according to aspects of the present disclosure.

FIG. 1 illustrates an exemplary network architecture 100 for location support of a UE 102 that supports and is currently using Narrow Band Internet of Things (NB-IoT) radio access or LTE radio access, which may be used to implement the techniques described herein below. The network architecture 100 may be referred to as an Evolved Packet System (EPS). As illustrated, the network architecture 100 may include a UE 102, an Evolved Universal Terrestrial Radio Access Network (E-UTRAN) 120, and an Evolved Packet Core (EPC) 130. The E-UTRAN 120 and the EPC 130 may be part of a Visited Public Land Mobile Network (VPLMN) that is a serving network for UE 102 and communicates with a Home Public Land Mobile Network (HPLMN) 140 for UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the network architecture 100 provides packet-switched services to UE 102. However, as those skilled in the art will readily appreciate, the various concepts presented throughout this disclosure may be extended to networks providing circuit-switched services.

The UE 102 may be any electronic device configured for NB-IoT and/or LTE radio access. The UE 102 may be referred to as a device, a wireless device, a mobile terminal, a terminal, a mobile station (MS), a mobile device, a Secure User Plane Location (SUPL) Enabled Terminal (SET) or by some other name and may correspond to (or be part of) a smart watch, digital glasses or other head-mounted display, fitness monitor, smart car, smart appliance, cellphone, smartphone, laptop, tablet, personal digital assistant (PDA), personal media player, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), LTE, NB-IoT, Enhanced machine type communication (eMTC) also referred to as LTE category M1 (LTE-M), Fifth Generation (5G) New Radio (NR), High Rate Packet Data (HRPD), WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi (also referred to as Wi-Fi) or Bluetooth® (BT). UE 102 may also support communication with one or more types of wireline network such as by using a Digital Subscriber Line (DSL), or packet cable for example. Although FIG. 1 shows only one UE 102, there may be many other UEs that can each correspond to UE 102.

The UE 102 may enter a connected state with a wireless communication network that may include the E-UTRAN 120 and EPC 130. In one example, UE 102 may communicate with a cellular communication network by transmitting wireless signals to, and/or receiving wireless signals from, a cellular transceiver, such as an evolved Node B (eNB) 104 in the E-UTRAN 120. The E-UTRAN 120 may include one or more additional eNBs 106. The eNB 104 provides user plane (UP) and control plane (CP) protocol terminations toward UE 102. The eNB 104 may be a serving eNB for UE 102 and may also be referred to as a base station, a base transceiver station, a radio base station, a radio transceiver, a radio network controller, a transceiver function, a base station subsystem (BSS), an extended service set (ESS), an NR NodeB (gNB) or by some other suitable terminology. The UE 102 also may transmit wireless signals to, or receive wireless signals from, a local transceiver (not shown in FIG. 1), such as an access point (AP), femtocell, Home Base Station, small cell base station, Home Node B (HNB) or Home eNodeB (HeNB), which may provide access to a WLAN (e.g., IEEE 802.11 network), a wireless personal area network (WPAN, e.g., Bluetooth network) or a cellular network (e.g., an LTE network or other WWAN such as those discussed in the next paragraph). Of course, it should be understood that these are merely examples of networks that may communicate with a mobile device over a wireless link, and claimed subject matter is not limited in this respect.

Examples of network technologies that may support wireless communication include NB-IoT, but may further include GSM, CDMA, WCDMA, LTE, NR, HRPD and eMTC radio types. NB-IoT, GSM, WCDMA, LTE, eMTC and NR are technologies defined by the Third Generation Partnership Project (3GPP). CDMA and HRPD are technologies defined by the Third Generation Partnership Project 2 (3GPP2). Cellular transceivers, such as eNBs 104 and 106, may comprise deployments of equipment providing subscriber access to a wireless telecommunication network for a service (e.g., under a service contract). Here, a cellular transceiver (e.g. eNB 104) may perform functions of a cellular base station in servicing subscriber devices within a cell determined based, at least in part, on a range at which the cellular transceiver is capable of providing access service.

The eNBs 104 and 106 are connected by an interface (e.g., the 3GPP S1 interface) to the VPLMN EPC 130. The EPC 130 includes a Mobility Management Entity (MME) 108, and a Serving Gateway (SGW) 112 through which data (e.g., Internet Protocol (IP) packets) may be transferred to and from UE 102. The MME 108 may be the serving MME for UE 102 and is then the control node that processes the signaling between UE 102 and the EPC 130 and supports attachment and network connection of UE 102, mobility of UE 102 (e.g., via handover between network cells and tracking areas) as well as establishing and releasing data bearers on behalf of UE 102. The MME 108 may also support data transfer to and from UE 102 using a 3GPP Cellular Internet of Things (CIoT) feature known as CIoT CP optimization in which data packets are transferred to and from the UE 102 via MME 108, rather than by bypassing MME 108, in order to avoid the overhead of establishing and releasing data bearers for UE 102. Generally, MME 108 provides bearer and connection management for UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may be a location server (LS) that supports location of UE 102 using the 3GPP control plane (CP) location solution defined in 3GPP technical specifications (TSs) 23.271 and 36.305. E-SMLC 110 may exchange messages with UE 102 for a positioning protocol as part of a CP location session to obtain a location for UE 102. The positioning protocol may be the 3GPP LTE Positioning Protocol (LPP) defined in 3GPP TS 36.355 and/or may be the LPP Extensions protocol (LPPe) defined by the Open Mobile Alliance (OMA). The V-GMLC 116, which may also be referred to simply as a Gateway Mobile Location Center (GMLC), may provide access on behalf of an external client (e.g., external client 150) or another network (e.g., HPLMN 140) to the location of UE 102. The external client 150 may be a web server or remote application that may have some association with UE 102 (e.g., may be accessed by a user of UE 102 via VPLMN E-UTRAN 120, VPLMN EPC 130 and HPLMN 140). The external client 150 may also be a server, application or computer system providing a location service to some other user or users which may include obtaining and providing the location of UE 102 (e.g., to enable a service such as friend or relative finder, asset tracking or child or pet location).

As illustrated, the HPLMN 140 includes a Home GMLC (H-GMLC) 148 that may be connected to the V-GMLC 116 (e.g., via the Internet), as well as a Packet Data Network Gateway (PDG) 114 that may be connected to the SGW 112 (e.g., via the Internet). The PDG 114 may provide UE 102 with Internet Protocol (IP) address allocation and IP and other data access to external networks (e.g., the Internet) and to external clients (e.g., external client 150) and external servers, as well as other data transfer related functions. In some cases, PDG 114 may be located in VPLMN EPC 130 and not in HPLMN 140 when UE 102 receives local IP breakout from VPLMN EPC 130. The PDG 114 may be connected to a location server (LS), such as a Home SUPL Location Platform (H-SLP) 118. The H-SLP 118 may support the SUPL UP location solution defined by OMA and may support location services for UE 102 based on subscription information for UE 102 stored in H-SLP 118. In some embodiments of network architecture 100, a Discovered SLP (D-SLP) or Emergency SLP (E-SLP) (not shown in FIG. 1), in or accessible from VPLMN EPC 130, may be used to locate UE 102 using the SUPL UP location solution. H-SLP 118 and E-SMLC 110 in network architecture 100 are both examples of an LS that may employ the LPP and/or combined LPP and LPPe (LPP/LPPe) protocols for positioning of UE 102.

In a CP location solution, such as the 3GPP CP location solution defined in 3GPP TS 23.271 and TS 36.305, signaling (e.g. including LPP, LPP/LPPe and other messages) to support location of UE 102 may be transferred between participating entities (e.g. V-GMLC 116, MME 108, E-SMLC 110, eNB 104 and UE 102) using existing signaling interfaces and protocols for VPLMN EPC 130 and E-UTRAN 120. In contrast, in a UP location solution such as SUPL, signaling (e.g. such as SUPL messages carrying embedded LPP and/or LPP/LPPe messages) to support location of UE 102 may be transferred between participating entities (e.g. UE 102 and H-SLP 118) using data bearers (e.g. using the Internet Protocol (IP)).

The H-GMLC 148 may be connected to a Home Subscriber Server (HSS) 145 for UE 102, which is a central database that contains user-related and subscription-related information for UE 102. H-GMLC 148 may provide location access to UE 102 on behalf of external clients such as external client 150. One or more of H-GMLC 148, PDG 114, and H-SLP 118 may be connected to external client 150, e.g., through another network, such as the Internet. In some cases, a Requesting GMLC (R-GMLC) located in another PLMN (not shown in FIG. 1) may be connected to H-GMLC 148 (e.g., via the Internet) in order to provide location access to UE 102 on behalf of external clients connected to the R-GMLC. The R-GMLC, H-GMLC 148 and V-GMLC 116 may support location access to UE 102 using the 3GPP CP solution defined in 3GPP TS 23.271.

It should be understood that while a VPLMN (comprising VPLMN E-UTRAN 120 and VPLMN EPC 130) and a separate HPLMN 140 are illustrated in FIG. 1, both PLMNs (networks) may be the same PLMN. In that case, (i) H-SLP 118, PDG 114, and HSS 145 may be in the same network (EPC) as MME 108 and E-SMLC 110, and (ii) V-GMLC 116 and H-GMLC 148 may be the same GMLC.

In particular implementations, UE 102 may have circuitry and processing resources capable of obtaining location related measurements (also referred to as location measurements and as measurements), such as measurements for signals received from Global Positioning System (GPS) or other Satellite Positioning System (SPS) space vehicles (SVs) 160, measurements for cellular transceivers such as eNBs 104 and 106, and/or measurements for local transceivers such as WiFi APs. UE 102 may further have circuitry and processing resources capable of computing a position fix or estimated location of UE 102 based on these location related measurements. In some implementations, location related measurements obtained by UE 102 may be transferred to an LS, such as E-SMLC 110 or H-SLP 118, after which the LS may estimate or determine a location for UE 102 based on the measurements.

Location related measurements obtained by UE 102 may include measurements of signals received from SVs 160 belonging to an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate LS (e.g., E-SMLC 110 or H-SLP 118) may then obtain a location estimate for UE 102 based on these location related measurements using any one of several position methods such as, for example, GNSS, Assisted GNSS (A-GNSS), Advanced Forward Link Trilateration (AFLT), Observed Time Difference of Arrival (OTDOA), Enhanced Cell ID (ECID), WLAN (also referred to as WiFi), or combinations thereof. In some of these techniques (e.g., A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, navigation signals, positioning reference signals (PRS) or other positioning related signals transmitted by the transmitters or SVs and received at UE 102. Here, LSs, such as E-SMLC 110 or H-SLP 118, may be capable of providing positioning assistance data (AD) to UE 102 including, for example, information regarding signals to be measured by UE 102 (e.g., expected signal timing, signal coding, signal frequencies, signal Doppler), locations and/or identities of terrestrial transmitters and/or associated cell antennas, and/ or signal, timing and orbital information for GNSS SVs to facilitate positioning techniques such as A-GNSS, AFLT, OTDOA, ECID and WLAN. The facilitation may include improving signal acquisition and measurement accuracy by UE 102 and/or, in some cases, enabling UE 102 to compute its estimated location based on the location measurements. For example, an LS may comprise an almanac (e.g., a Base Station Almanac (BSA)) which indicates the locations and identities of cellular transceivers and transmitters (e.g., eNBs 104 and 106) and/or local transceivers and transmitters in a particular region or regions such as a venue, and may further contain information descriptive of signals transmitted by these transceivers and transmitters such as signal power, signal timing, signal bandwidth, signal coding and/or signal frequency.

In the case of ECID, a UE 102 may obtain measurements of signal strength (e.g., Received Signal Strength Indication (RSSI) or Reference Signal Received Power (RSRP)) for signals received from cellular transceivers (e.g., eNBs 104, 106) and/or local transceivers and/or may obtain a Signal to Noise ratio (S/N), a Reference Signal Received Quality (RSRQ), and/or a Round Trip signal propagation Time (RTT) between UE 102 and a cellular transceiver (e.g., eNB 104 or 106) or a local transceiver. A UE 102 may transfer these measurements to an LS (e.g., E-SMLC 110 or H-SLP 118) to determine a location for UE 102, or in some implementations, UE 102 may use these measurements together with assistance data (e.g., terrestrial almanac data) received from an LS or from a cellular transceiver (e.g. eNB 104) to determine a location for UE 102 using ECID.

In the case of OTDOA, UE 102 may measure a Reference Signal Time Difference (RSTD) between signals, such as a Positioning Reference Signal (PRS) and/or a Cell specific Reference Signal (CRS), received from nearby transceivers or base stations (e.g., eNBs 104 and 106). An RSTD measurement may provide the time of arrival difference between signals (e.g., CRS or PRS) received at UE 102 from two different transceivers (e.g., an RSTD between signals received from eNB 104 and from eNB 106). The UE 102 may return the measured RSTDs to an LS (e.g., E-SMLC 110 or H-SLP 118) which may compute an estimated location for UE 102 based on the measured RSTDs and the known locations and known signal timing for the measured transceivers. In some implementations of OTDOA, the signals used for RSTD measurements (e.g., PRS or CRS signals) may be accurately synchronized by the transceivers or transmitters to a common universal time such as GPS time or coordinated universal time (UTC), e.g., using a GPS or other GNSS receiver at each transceiver or transmitter to accurately obtain the common universal time.

In the case of A-GNSS, a UE 102 may obtain measurements of Doppler, pseudorange, code phase and/or carrier phase for one more SVs 160 for one or more GNSSs. In the case of WLAN positioning, a UE 102 may obtain the identities of one or more visible WiFi APs and possibly measurements for beacon frames and/or other signals received from visible WiFi APs, such as measurements of RSSI and/or RTT. As described above for ECID and OTDOA, these measurements may be transferred to an LS (e.g. E-SMLC 110 or H-SLP 118) to compute a location for UE 102 or UE 102 may compute the location itself based on AD (e.g. AD for SVs 160 or WLAN APs) received from an LS, cellular transceivers or from the transmitters themselves (e.g. from SVs 16). In some implementations, hybrid combinations of two or more position methods may be used by an LS and UE 102 to obtain a location for UE 102.

Position methods such as A-GNSS, OTDOA, AFLT, ECID and WLAN, as described above, may be referred to as downlink (DL) position methods because they are supported by UEs such as UE 102 based on measurements by the UE of downlink signals transmitted from terrestrial transmitters (e.g., eNBs 104 and 106) and/or SPS SVs (e.g., SVs 160). In contrast, with an uplink (UL) position method, an entity on the network side (e.g., eNB 104 or eNB 106) may measure uplinks signals transmitted by a UE (e.g., UE 102) in order to obtain a location estimate for the UE. The measurements for an UL position method may then be transferred to an LS (e.g., E-SMLC 110) using the LPP Annex (LPPa) protocol defined by 3GPP in 3GPP TS 35.455 in order to enable the LS to determine a location of the UE.

An estimate of a location of a UE 102 may be referred to as a location, location estimate, location fix, fix, position, position estimate or position fix, and may be geodetic, thereby providing location coordinates for UE 102 (e.g., latitude and longitude) which may or may not include an altitude component (e.g., height above sea level, height above or depth below ground level, floor level or basement level). Alternatively, a location of UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which UE 102 is expected to be located with some given or default probability or confidence level (e.g., 67% or 95%). A location of a UE 102 may further be an absolute location (e.g., defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g., obtained by UE 102 or by another entity such as eNB 104) that are used to determine (e.g., calculate) a location estimate for UE 102 may be referred to as measurements, location measurements, location related measurements, positioning measurements or position measurements and the act of determining a location for UE 102 may be referred to as positioning of UE 102 or locating UE 102.

For downlink position methods and possibly for some uplink position methods, a UE 102 and a LS (e.g., E-SMLC 110 or H-SLP 118) may need to exchange positioning protocol messages, such as messages for LPP, LPP/LPPe or some other positioning protocol. However, for a UE 102 with NB-IoT access, messages may need to be transmitted multiple times in an UL and/or DL direction to ensure error free reception when S/N and an associated coverage enhancement (CE) level (e.g. as with a CE level of 2) are poor. Combined with a higher message transmission delay caused by limited bandwidth (e.g. with an NB-IoT bandwidth of only 180 KHz), this may lead to very long message transfer times (e.g. of several seconds) which may limit both the number and size of positioning protocol messages which can be exchanged between a UE 102 and an LS (e.g. E-SMLC 110 or H-SLP 118) during a location session. Because AD provided by the LS and/or Location Information (LI) provided by UE 102 (or, more generally, the downlink (DL) AD information provided by the LS and/or the uplink (UL) measurement and location related information provided by the UE) in a location session can comprise several hundred or even several thousand octets, devices may not be able to provide or enable a position fix in cases where a position of UE 102 is requested more frequently or with a lower delay requirement than a location is able to be determined in view of the transmission delays. In addition, the network bandwidth usage to obtain a location for a UE 102 with a poor NB-IoT coverage level, and UE 102 resources (e.g., UE 102 battery) needed to obtain the location, may need to be limited, leading to a need to limit the amount of AD and/or LI for positioning of UE 102.

The network architecture 100 shown in FIG. 1 may apply to UE 102 wireless access using LTE or NB-IoT to VPLMN E-UTRAN 120 and VPLMN EPC 130. However, other similar network architectures may exist in which a UE 102 accesses other types of radio access network (RAN) and/or other types of core network. For example, when UE 102 uses an NR Radio Access Technology (RAT), UE 102 may access a Next Generation RAN (NG-RAN) and a 5G Core Network (5GCN) which may replace E-UTRAN 120 and EPC 130, respectively, in network architecture 100. In this case, some network elements for EPC 130 shown in FIG. 1 may be different. For example, MME 108 may be replaced by an Access and Mobility Management Function (AMF) and E-SMLC 110 may be replaced by an LS supporting a CP location solution for NR wireless access such as a Location Management Function (LMF). In the description of the various techniques below, it may therefore be possible to substitute an AMF for MME 108 and an LMF for E-SMLC 110 in examples where UE 102 has NR RAT access rather than NB-IoT or LTE RAT access.

Figure 2A:
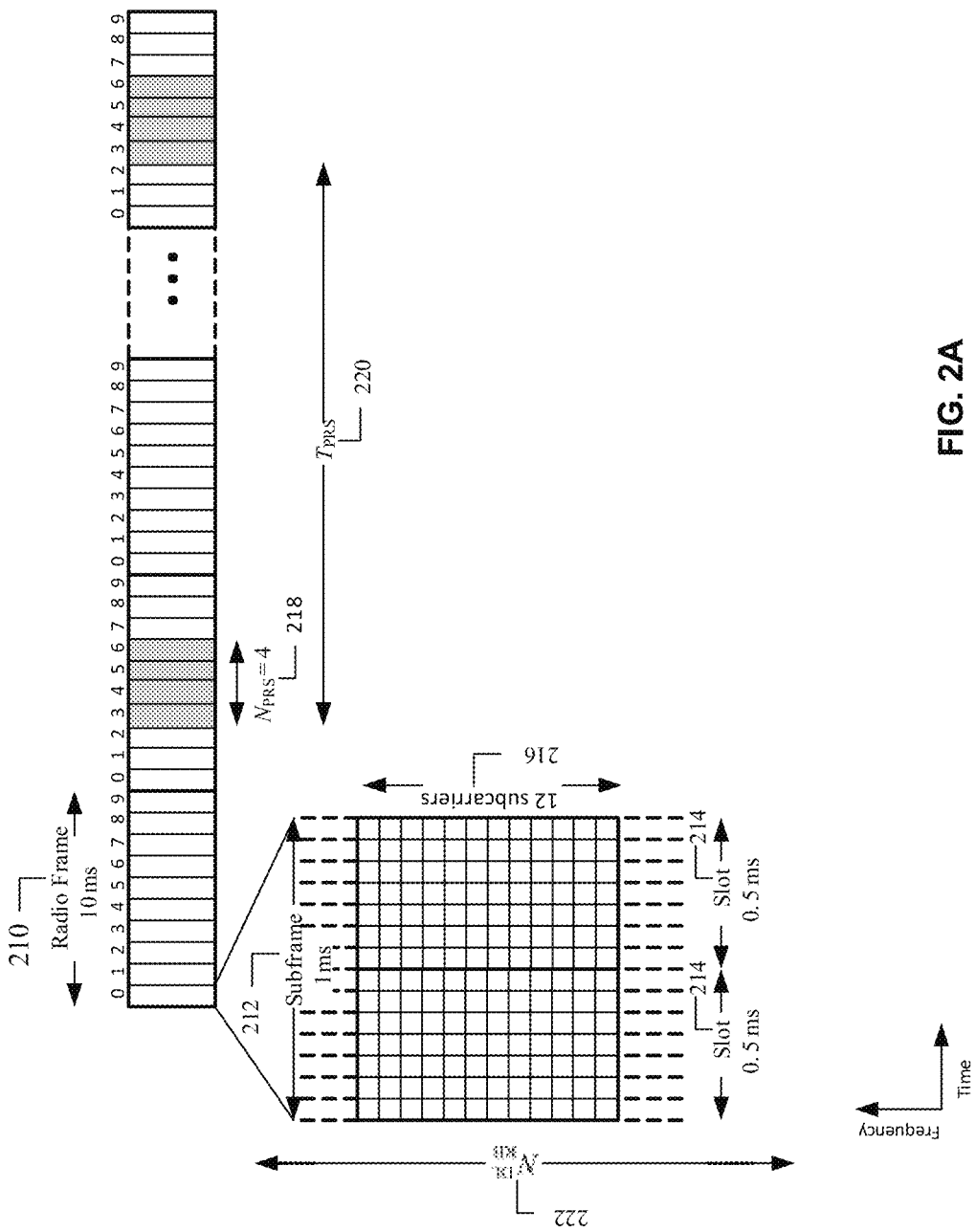
FIGS. 2A and 2B show the structure of exemplary frame sequences for a Positioning Reference Signal for LTE wireless access.

FIG. 2A shows the structure of an exemplary LTE frame sequence for any cell that supports LTE with PRS positioning occasions according to aspects of the present disclosure. In FIG. 2A, time is represented on the X (horizontal) axis, while frequency is represented on the Y (vertical) axis. As shown in FIG. 2A, downlink and uplink LTE Radio Frames 210 are of 10 ms duration each. For downlink Frequency Division Duplex (FDD) mode, Radio Frames 210 are organized into ten subframes 212 of 1 millisecond (ms) duration each. Each subframe 212 comprises two slots 214, each of 0.5 ms duration.

In the frequency domain, the available bandwidth may be divided into uniformly spaced orthogonal subcarriers 216. For example, for a normal length cyclic prefix using 15 KHz spacing, subcarriers 216 may be grouped into a group of 12 subcarriers. Each grouping, which comprises 12 subcarriers 216, in FIG. 2A, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is given by $N_{RB}^{DL}$ 222. For example, for a 3 MHz channel bandwidth in the above example, the number of available resource blocks on each channel 222 is given by $N_{RB}^{DL}=15$.

In some embodiments, a set of antennas corresponding to a set of cells, respectively, may transmit PRS signals. PRS signals are transmitted by a base station (e.g. eNB 104) in special positioning subframes that are grouped into positioning occasions (also referred to as PRS positioning occasions and PRS occasions). For example, in LTE, a positioning occasion can comprise a number, denoted as $N_{PRS}$, of between 1 and 160 consecutive positioning subframes and can occur periodically at intervals of 5, 10, 20, 40, 80, 160, 320, 640, or 1280 milliseconds. In the example shown in FIG. 2A, the number of consecutive positioning subframes 218 is 4 and may be written as $N_{PRS}=4$. The positioning occasions recur with PRS Periodicity 220. In FIG. 2A, PRS Periodicity 220 is denoted by $T_{PRS}$. In some embodiments, $T_{PRS}$ may be measured in terms of the number of subframes between the start of consecutive positioning occasions.

Within each positioning occasion, PRS may be transmitted with a constant power. PRS can also be transmitted with zero power (i.e., muted). Muting, which turns off a regularly scheduled PRS transmission, may be useful when PRS patterns between cells overlap. Muting aids signal acquisition by UE 102. Muting may be viewed as the non-transmission of a PRS for a given positioning occasion in a particular cell. Muting patterns may be signaled to UE 102 using bit strings. For example, in a bit string signaling a muting pattern, if a bit at position j is set to "0", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, PRS code sequence, etc., may be configured by a network and may be signaled to UE 102 (e.g., by a server such as E-SMLC 110) as part of the OTDOA assistance data. For example, LPP or LPPe messages exchanged between UE 102 and the server may be used to transfer location assistance data from the server to UE 102 including OTDOA assistance data. OTDOA assistance data may include reference cell information and neighbor cell information. The reference cell and neighbor cell information may each contain the PCIs of the cells as well as PRS configuration parameters for the cells.

The OTDOA assistance data may include "expected RSTD" parameters, which provide UE 102 with information about the approximate RSTD values UE 102 is expected to measure at its current location together with an uncertainty of the expected RSTD parameter. The expected RSTD together with the uncertainty defines then a search window for UE 102 where UE 102 is expected to measure the RSTD value. "Expected RSTDs" for cells included in the OTDOA assistance data neighbor cell information are usually provided relative to an OTDOA assistance data reference cell. OTDOA assistance data may also include PRS configuration information parameters, which allow UE 102 to determine approximately when a PRS positioning occasion occurs on signals received from various cells, and to determine the PRS sequence transmitted from various cells in order to measure a Time of Arrival (TOA) of a PRS at UE 102. UE 102 may then determine an RSTD measurement for a reference cell and a neighbor cell from the difference between a TOA measurement for each cell.

Figure 2B:
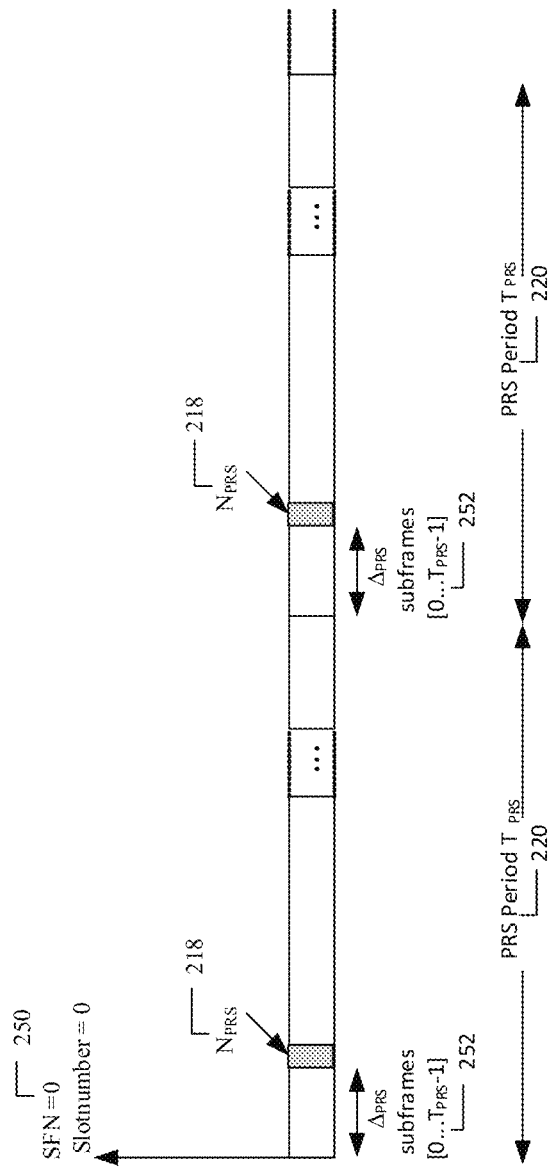

FIG. 2B illustrates the relationship between the System Frame Number (SFN), the cell specific subframe offset ($\Delta_{PRS}$) and the PRS Periodicity 220 according to aspects of the present disclosure. Typically, the cell specific PRS subframe configuration is defined by a "PRS Configuration Index" $I_{PRS}$ included in the OTDOA assistance data. The cell specific subframe configuration period and the cell specific subframe offset for the transmission of positioning reference signals are defined based on the $I_{PRS}$, in 3GPP TS 36.211 and as listed in Table 1 below.

TABLE 1

Positioning reference signal subframe configuration

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the System Frame Number (SFN) of a cell that transmits PRS. PRS instances, for the first subframe of a PRS positioning occasion, satisfy $$(10 \times n_f + \lfloor n_s/2 \rfloor - \Delta_{PRS}) \bmod T_{PRS} = 0 \quad \text{eq. 1}$$

where, $n_f$ is the SFN with $0 \leq SFN \leq 1023$, $n_s$ is the slot number of the radio frame with $0 \leq n_s \leq 19$, $T_{PRS}$ is the PRS period, and $\Delta_{PRS}$ is the cell-specific subframe offset.

As shown in FIG. 2B, the cell specific subframe offset $\Delta_{PRS}$ 252 may be defined in terms of the number of subframes transmitted starting from System Frame Number 0, Slot Number 0 250 to the start of a PRS positioning occasion. In FIG. 2B, the number of consecutive positioning subframes 218, $N_{PRS}$=4.

In some embodiments, when UE 102 receives a PRS configuration index $I_{PRS}$ in the OTDOA assistance data, UE 102 may determine PRS periodicity $T_{PRS}$ and PRS subframe offset $\Delta_{PRS}$ using Table 1. Upon obtaining information about the frame and slot timing i.e., the SFN and slot number ($n_f$, $n_s$) for a cell, UE 102 may determine the frame and slot when a PRS is scheduled in the cell.

FIGS. 2A and 2B described support of PRS signals for LTE wireless access by a UE 102 (e.g. as defined in 3GPP TS 36.211). A PRS for NB-IoT wireless access by a UE 102 may be referred to as a narrowband positioning reference signal (NPRS) and may be supported and configured in a similar manner to a PRS as described in FIGS. 2A and 2B with the difference that an NPRS may comprise a single resource block with a bandwidth of 200 KHz (or 180 KHz of effective signaling bandwidth). In addition, an NPRS may use frequency hopping between consecutive subframes of the same NPRS positioning occasion and/or between consecutive NPRS positioning occasions. Alternatively, an eNB may transmit multiple NPRS signals, each using a different resource block (and thus a different carrier frequency), which may allow UE 102 to measure an NPRS for the same eNB using several different frequencies which may improve measurement accuracy in a similar manner to frequency hopping.

Figure 3:
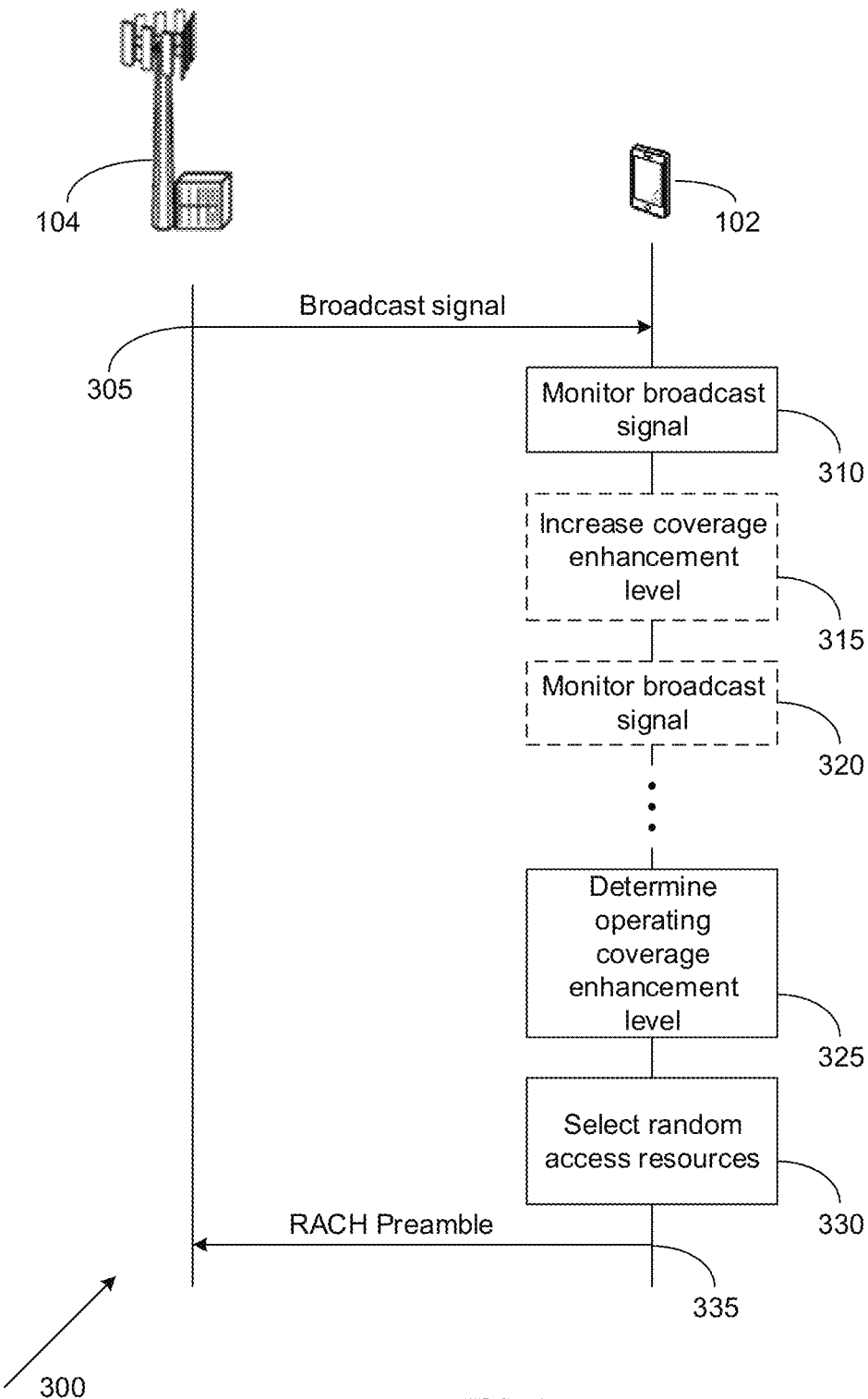
FIG. 3 illustrates an exemplary process flow diagram for a system that supports CE level determination in accordance with aspects of the present disclosure.

FIG. 3 illustrates an exemplary process flow 300 for a system that supports CE level determination for NB-IoT access in accordance with various aspects of the present disclosure. The process flow 300 includes the UE 102 and eNB 104 from network architecture 100. In some cases, the process flow 300 may be an example of aspects of random access procedures. For example, the process flow 300 may be employed after the UE 102 has acquired a primary synchronization signal (PSS) and a secondary synchronization signal (SSS) for NB-IoT or LTE access to eNB 104.

Process flow 300 may start at stage 305, where the eNB 104 may send, and the UE 102 may receive, a broadcast signal which may be periodically repeated. For example, the broadcast signal may comprise the transmission content of a narrowband physical broadcast channel (NPBCH) for NB-IoT access or a physical broadcast channel (PBCH) for LTE access. The broadcast signal may be transmitted by eNB 104 with a high level of coverage enhancement (e.g., CE level 3) which may comprise transmitting multiple identical samples (e.g. 64 samples) of the broadcast signal by eNB 104, which may allow a UE 102 which has a high CE coverage level (e.g. CE level 2 or 3) to receive and decode the broadcast signal by receiving and combining multiple samples using RF coherent (or non-coherent) integration. In some cases, the broadcast signal includes a Master Information Block (MIB) which may comprise information essential for UE 102 access to eNB 104, e.g. which is conveyed using the NPBCH or PBCH.

At stage 310, the UE 102 may monitor the broadcast signal. In some examples, monitoring the broadcast signal may include test-decoding the broadcast signal at a test CE level (e.g., CE level 0) by UE 102 that is less than the CE level supported by the signal (e.g., CE level 3). That is, the UE 102 may attempt to decode the broadcast signal by receiving and combining a smaller number of samples, which may reduce the gain and S/N of the signal compared to decoding the signal only after all the samples have been received and combined. For example, if UE 102 attempts to decode the broadcast signal after only one sample has been received (which may correspond to a CE level of 0), the S/N of the signal may be around 15 dB less than when 32 samples have been received and combined. In some cases, the UE 102 may attempt to partially decode the signal. For example, the UE 102 may attempt to decode only a portion of the signal. Additionally, or alternatively, the UE 102 may attempt to decode the signal before the highest CE level has been attained. If the decode attempt is successful, the UE 102 may proceed to stage 325 and determine the operating CE level. For example, the UE 102 may select the test decode CE level to be the actual operating CE level of the UE 102.

If the decode attempt at stage 310 is unsuccessful, the UE 102 may proceed to stage 315 and increase the test CE level (e.g., the test CE level may be incremented to CE level 1), which may correspond to receiving and combining more samples of the broadcast signal. Subsequently, at stage 320, the UE 102 may monitor the broadcast signal according to the new test CE level (e.g., CE level 1). For instance, the UE 102 may wait until a gain of 5 dB is reached (e.g. corresponding to receiving and combining four times as many samples of the broadcast signal as at stage 310) before attempting to decode the broadcast signal. If the decoding is unsuccessful, the UE 102 may continue to increase the test CE level for each subsequent test-decoding of the broadcast signal (e.g. by receiving and decoding additional samples of the broadcast signal) until a decoding is successful. Once a decoding is successful, the UE 102 may proceed to stage 325 and select the test CE level that resulted in the successful decoding as its operating CE level. Thus, the UE 102 may determine its CE level based on broadcast signal monitoring.

In certain scenarios, the UE 102 may verify the test CE level before assigning it as the operating CE level. For example, the UE 102 may receive subsequent broadcast signals and attempt to decode each broadcast signal using the test CE level. The UE 102 may continue to decode subsequent broadcast signals until the number of successful decoding attempts has satisfied a threshold. Once a threshold number of decoding attempts have been successful, the UE 102 may determine the operating CE level as equal to the test CE level. In some cases, determining the operating CE level may include communicating using the operating CE level. In this or other examples, determining the operating CE level may include sending an indication of the operating CE level to the eNB 104.

At stage 330, the UE 102 may select random access resources for communication with the eNB 104. In one example, the random access resources may be physical random access channel (PRACH) resources (e.g. RF frequencies) for conveying a random access preamble. There may be a number of resources (e.g., NB-IoT resources) available for random access use; however, some resources may be associated with certain levels of coverage enhancement. Accordingly, the UE 102 may select resources (e.g. frequencies) for a random access procedure that correspond to the CE level selected at stage 325. At stage 335, the UE 102 may transmit, and the eNB 104 may receive, a random access channel (RACH) preamble conveyed by the resources selected at stage 330. The UE 102 may apply the determined CE level to the transmission. The resources used to carry the RACH preamble may intrinsically indicate the CE level of the UE 102 as determined at stage 325. Thus, the eNB 104 may determine the CE level of the UE 102 based on the resources (e.g. frequencies) used to convey the RACH preamble.

Figure 4A:
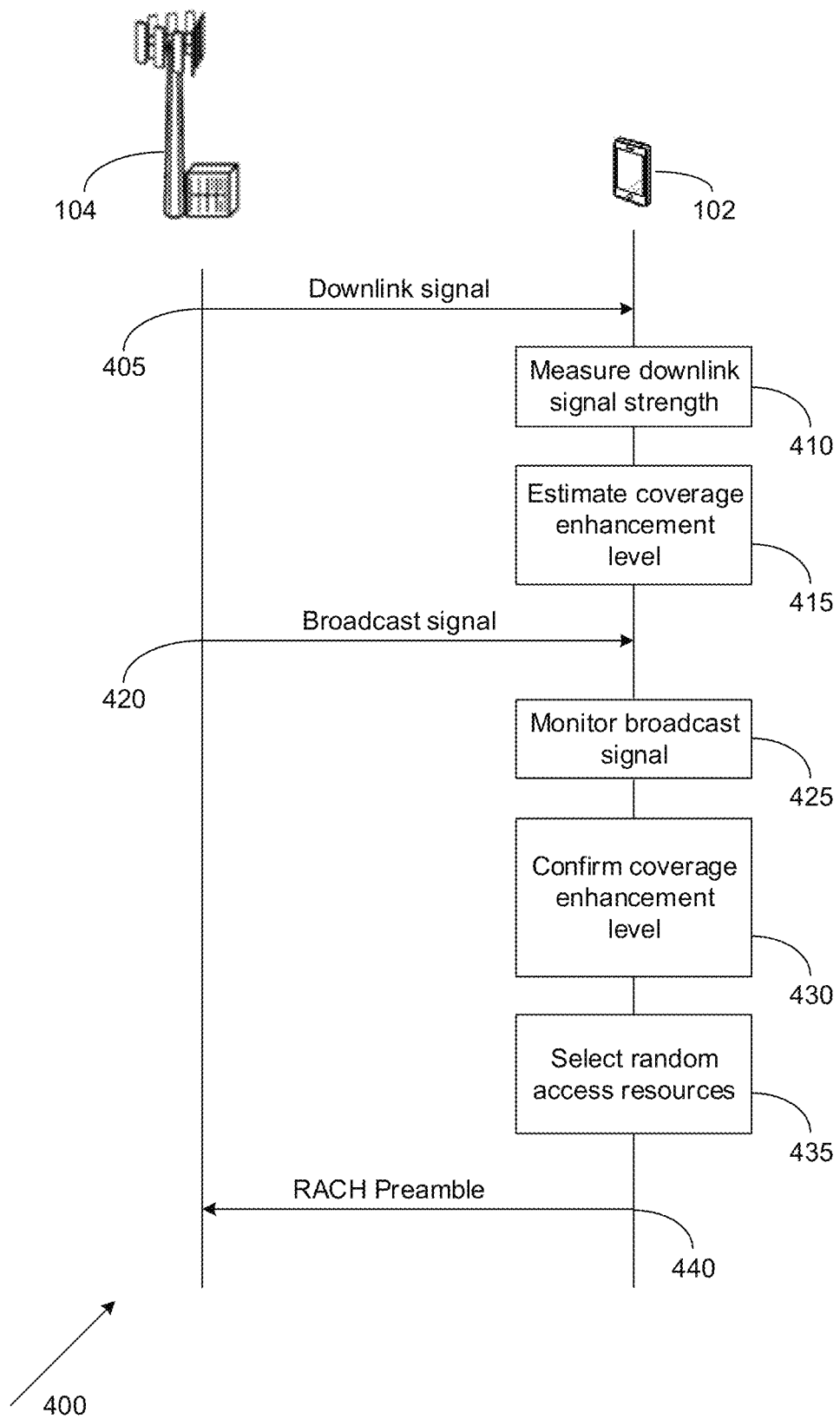
FIG. 4A illustrates an example of a process flow diagram for a system that supports CE level determination in accordance with aspects of the present disclosure.

FIG. 4A illustrates an example of a process flow 400 for a system that supports CE level determination in accordance with various aspects of the present disclosure. The process flow 400 includes the UE 102 and eNB 104 from network architecture 100. The process flow 400 may be an example of a random access procedure, such as in a situation in which the UE 102 has acquired a PSS and SSS from eNB 104.

At stage 405, the eNB 104 may send, and the UE 102 may receive, a downlink signal. In some cases, the downlink signal may be a reference signal, such as a CRS or a Narrowband Reference Signal (NRS). At stage 410, the UE 102 may measure the signal strength of the downlink signal to determine the path loss associated with the eNB 104 and the UE 102. At stage 415, the UE 102 may estimate the CE level based on the path loss. For example, the UE 102 may estimate the CE level to be high (e.g. CE level 2 or 3) when the estimated path loss is high and may estimate the CE level to be low (e.g. CE level 0 or 1) when the estimated path loss is low. At stage 420, the eNB 104 may transmit, and the UE 102 may receive, a broadcast signal (e.g. a signal comprising a transmission of a PBCH or NPBCH). Proceeding to stage 425, the UE 102 may monitor the broadcast signal. For example, the UE 102 may test-decode the broadcast signal once a number of identical samples of the broadcast signal have been received and combined by UE 102 (e.g. as described for FIG. 3) that provide a gain in broadcast signal S/N consistent with that needed to enable decoding for the estimated CE level. At stage 430, if the test-decoding is successful, the UE 102 may confirm the estimated CE level. Accordingly, at stage 435, the UE 102 may select RACH resources (e.g. an RF frequency) according to the confirmed CE level. At stage 440, the UE 102 may transmit, and the eNB 104 may receive, a RACH preamble conveyed by the selected random access resources.

If the test-decoding at stage 425 is unsuccessful, the UE 102 may return to stage 405. That is, the UE 102 may receive another broadcast signal (e.g. a CRS or NRS) and may measure the signal strength at stage 410. In some scenarios, the UE 102 may obtain a number of consecutive signal strength measurements at stage 410 and may combine these in order to determine a more reliable path loss. After making the measurements at stage 410, the UE 102 may proceed to stages 415-430. Once the appropriate CE level has been confirmed (e.g., at stage 430), the UE 102 may proceed to stage 435 and stage 440.

In some aspects, if the test-decoding at stage 425 fails, the UE 102 may monitor the broadcast signal such as described with reference to FIG. 3. For example, instead of repeating stages 405-415, the UE 102 may iteratively test-decode the broadcast signal using an increasing number of identical samples associated with increased CE levels (as described for FIG. 3) until a successful decoding is achieved. Thus, the UE 102 may utilize the estimated CE level obtained at stage 415 as an initial CE level for the recursive test-decoding process described with reference to FIG. 3.

Figure 4B:
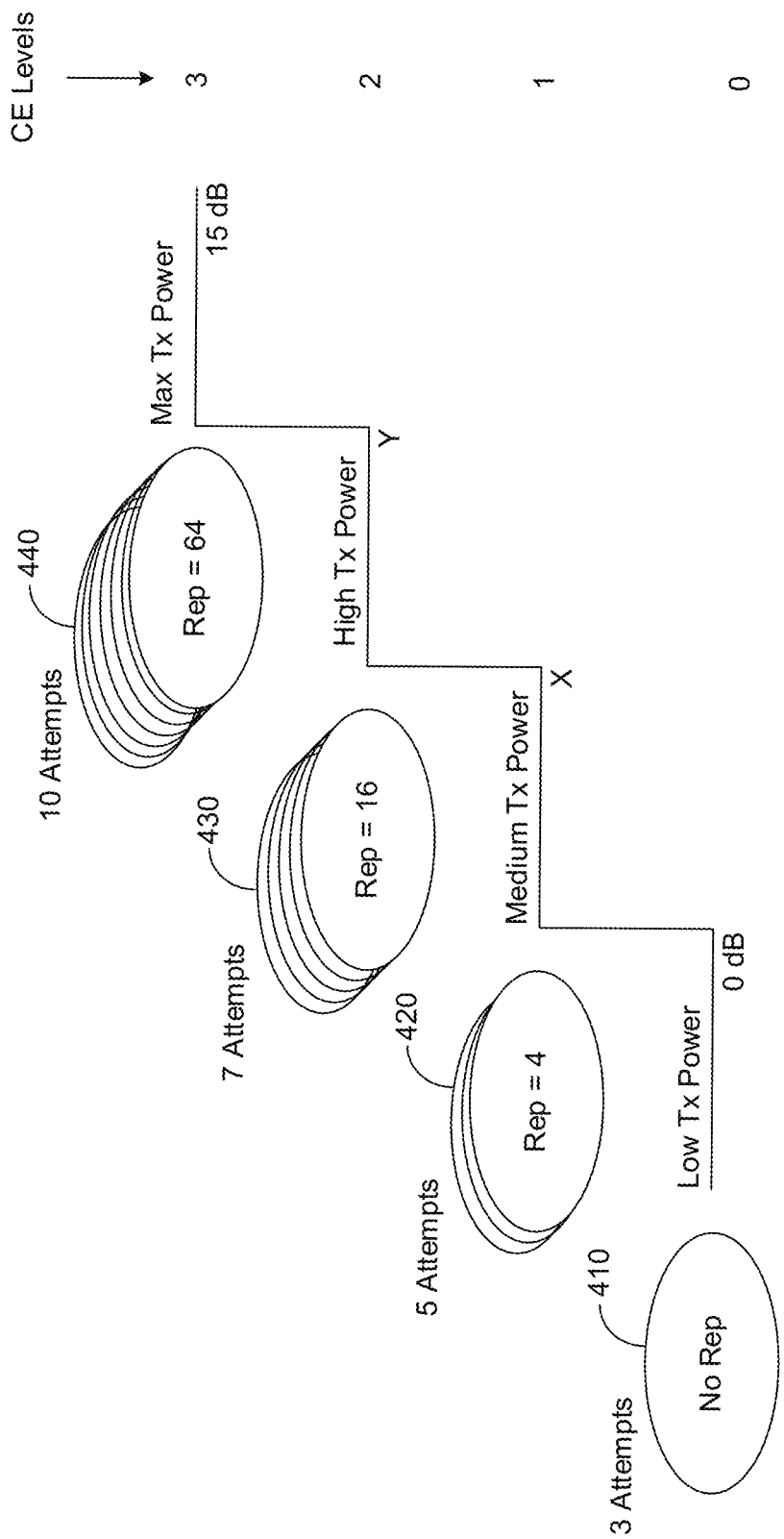
FIG. 4B illustrates an exemplary correlation of a CE level and a response time for a UE according to aspects of the present disclosure.

FIG. 4B illustrates an exemplary correlation of a CE level of a UE 102 (e.g. as determined by UE 102 using the process of FIG. 3 or FIG. 4A) with a response time of the UE 102 when in communication with a server (e.g. E-SMLC 110) according to aspects of the present disclosure. FIG. 4B illustrates a PRACH transmission by UE 102 to serving eNB 104 to request eNB 104 to provide a signaling connection to UE 102 to enable UE 102 to progress from an idle state into a connected state (e.g. which may be needed to allow UE 102 to respond to a paging request from eNB 104 or to return location measurements to an LS such E-SMLC 110). Each PRACH transmission can comprise one or more transmission attempts and one or more repetitions of each transmission attempt, depending on the CE level of UE 102, as described next.

As shown in FIG. 4B, at CE level 0, the UE 102 (not shown in FIG. 4B) may perform 3 transmission attempts 410 for an NB-IoT or enhanced machine type communication (eMTC) physical random access channel (PRACH) transmission to eNB 104 (not shown in FIG. 4B). Within each of the 3 attempts 410, the UE 102 may perform no additional repetition (Reps) for the PRACH. The UE 102 may also operate at a low transmission power level.

At CE level 1, the UE 102 may perform 5 attempts 420 for the NB-IOT or eMTC PRACH transmission to eNB 104. Within each of the 5 attempts 420, the UE may perform 4 repetitions for PRACH. The UE 102 may also operate at a medium transmission power level.

At CE level 2, the UE 102 may perform 7 attempts 430 for the NB-IoT or eMTC PRACH transmission to eNB 104. Within each of the 7 attempts 430, the UE 102 may perform 16 repetitions for PRACH. The UE may operate at a high transmission power level.

At CE level 3, the UE 102 may perform 10 attempts 440 for the NB-IoT or eMTC PRACH requirement to eNB 104. Within each of the 10 attempts 440, the UE may perform 64 repetitions for PRACH. The transmission power level may be set to a maximum available level for the UE 102.

As shown in FIG. 4B, as the CE level of the UE 102 increases, the duration for the UE 102 to send a PRACH transmission to eNB 104 also increases due to the increasing number of PRACH attempts and PRACH repetitions. The increased duration may increase the delay in a transition of UE 102 from an idle state to a connected state. A similar increase in delay may occur when UE 102 sends multiple repetitions of portions of an LPP message (e.g. containing RSTD measurements) to eNB 104 (e.g. to be forwarded to E-SMLC 110) or receives multiple repetitions of portions of an LPP message from eNB 104 (e.g. containing AD from E-SMLC 110 to assist RSTD measurements). As for the PRACH example in FIG. 4B, the multiple attempts and repetitions may be associated with a CE level for UE 102 and may increase when the CE level for UE 102 is increased. The increased delay in PRACH access to the eNB 104 and in transferring LPP messages between UE 102 and eNB 104 may increase the duration of OTDOA positioning of UE 102 (and/or positioning of UE 102 using other position methods such as A-GNSS, ECID or WLAN), which may prevent a location estimate for UE 102 being obtained by E-SMLC 110 or may impair the accuracy of a location estimate by reducing the number of RSTD measurements (or the number of other measurements such as A-GNSS, ECID or WLAN measurements) which UE 102 can obtain and return to E-SMLC 110 within a limited response time requirement. Note that as described above in association with FIG. 4A and FIG. 4B, different CE levels of the UE 102 can produce different response delays in UE 102 communications with the eNB 104 and an LS (e.g. E-SMLC 110), e.g. because of the different number of PRACH attempts and PRACH repetitions (or LPP message attempts and repetitions) performed for the different CE levels of the UE 102. In some implementations, such difference in response delays in communications between the UE 102 and the eNB 104 or an LS may be used to determine the CE level of the UE 102, as described later herein.

According to aspects of the present disclosure, a message (e.g. an LPP message) can be used to enable a current Coverage Enhancement (CE) mode/level for a UE 102 (e.g. which directly maps to downlink and uplink repetition attempts as described for FIGS. 3-4B) to be provided by a UE 102 to the E-SMLC 110. The E-SMLC 110 may use the received CE level to estimate the delay in sending and receiving LPP messages to and from the UE 102 for different sizes of LPP message. The E-SMLC 110 may then determine reduced LPP message sizes that will enable a location for the UE 102 to be obtained within a maximum required overall response time. Alternatively, the E-SMLC 110 may determine an increased response time for obtaining a location of UE 102 and may send the increased response time (or a portion of the increased response time) to UE 102 in an LPP message requesting location measurements (e.g. RSTD measurements) or a location estimate from UE 102. In order to enable smaller LPP message sizes, the E-SMLC 110 may, for example, reduce the number of measurements (e.g. RSTD measurements) requested from UE 102 and/or may provide a smaller amount of AD to UE 102 to assist in obtaining location measurements.

According to aspects of the present disclosure, providing an internal delay for each RF receive path and other receive path details by a UE 102 to a location server (e.g. E-SMLC 110) may improve the accuracy of OTDOA positioning. In supporting carrier aggregation, mobile devices (e.g. UE 102) may typically have four or more RF receive paths, and one of them may be selected to obtain and measure a neighbor cell PRS or NPRS (e.g. via a measurement gap, idle receive path etc.). The capability for UE 102 to provide the internal RF receive delay of UE 102 to the E-SMLC 120 may be extended to each RF receive path for UE 102 as the internal delay can be dependent on each RF receive path due to different components being used in the RF front-end of UE 102. Hence, it may be useful for UE 102 to provide details of the RF receive path information to E-SMLC 110 when different PRS or NPRS signals are measured by UE 102, in order to achieve an accurate location determination.

Figure 5A:
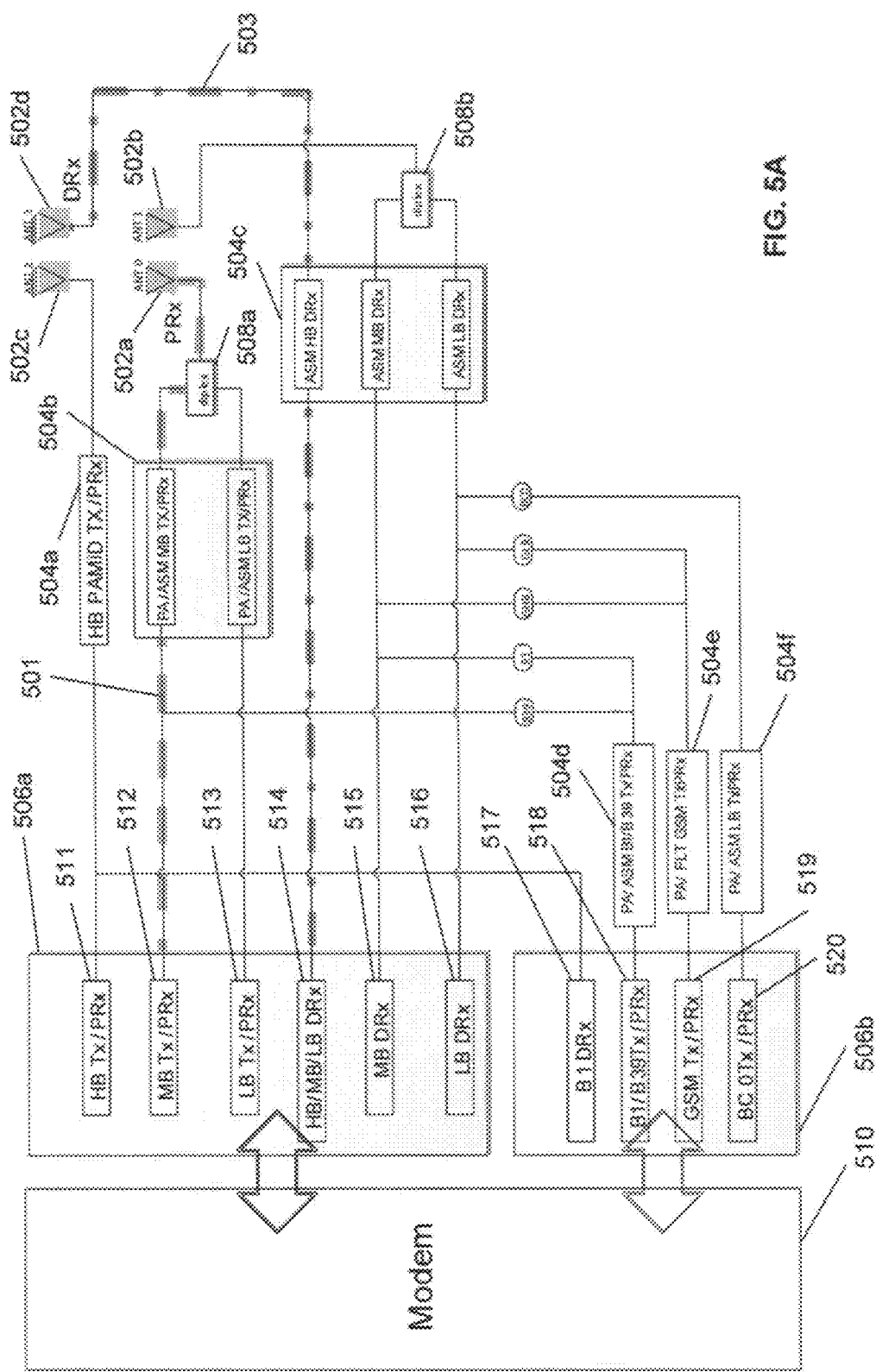
FIGS. 5A and 5B illustrate exemplary implementations of signal paths through an RF front-end of a UE according to aspects of the present disclosure.

FIG. 5A illustrates exemplary implementations of RF signal paths through a front-end of a UE 102 according to aspects of the present disclosure. In the example shown in FIG. 5A, to support carrier aggregation (e.g. for LTE), a transceiver for UE 102 may include a plurality of antennas (502a-502d), one or more power amplifiers and/or antenna switch modules (504a-504f), one or more multi-mode radio frequency transceivers (506a-506b), one or more diplexers (508a-508b) coupled between the corresponding antennas (502a-502d) and the power amplifier and/or antenna switch modules (504a-504f), and a modem 510.

In some implementations, a power amplifier and/or antenna switch, such as 504a, may be a high-band power amplifier module including duplexer. In some other implementations, a power amplifier and/or antenna switch, such as 504b, may include a mid-band and a low-band power amplifier and antenna switch modules. In yet some other implementations, a power amplifier and/or antenna switch, such as 504c, may include a high-band, a mid-band, and a low-band antenna switches. In yet some other implementations, a power amplifier and/or antenna switch, such as 504d, may be configured to support certain specific bandwidth such as a bandwidth for a LTE band B1 and/or B39. In yet some other implementations, a power amplifier and/or antenna switch, such as 504e, may be configured to support a third party power amplifier for GSM signals.

In some implementations, a multi-mode radio frequency transceiver, such as 506a, may include one or more of the following: 1) high-band transceiver 511; 2) mid-band transceiver 512; 3) low-band transceiver 513; 4) high-band, mid-band, or low-band receiver 514; 5) a mid-band receiver, 515; and 6) a low-band receiver 516. In some other implementations, a multi-mode radio frequency transceiver, such as 506b, may include one or more of the following: 1) a band B1 receiver 517; 2) a band B1 or B39 transceiver 518; 3) a GSM transceiver 519; and 4) a BC0 transceiver 520.

According to aspects of the present disclosure, a UE 102 may be implemented with various capabilities to support carrier aggregation. In supporting the various possible signals received from different carriers, the RF path of a received signal in UE 102 can vary as it may depend on the type of signal being received. As a result, the delay through the different components in the received path in UE 102 can change, which can in turn affect the accuracy in measurements of RSTD for OTDOA positioning. For example, as shown in FIG. 5A, one exemplary signal path (shown by the dashed line 501) may be through antenna 502a, diplexer 508a, power amplifier and/or antenna switch 504b, multi-mode radio frequency transceiver 506a, and modem 510. Another exemplary signal path (shown by the dotted line 503) may be through antenna 502d, power amplifier and/or antenna switch 504c, multi-mode radio frequency transceiver 506a, and modem 510. Since the path of a received signal can change, more accurate positioning may be achieved when information for the internal RF delay of UE 102 is provided to the server (e.g. E-SMLC 110) for positioning applications.

Figure 5B:
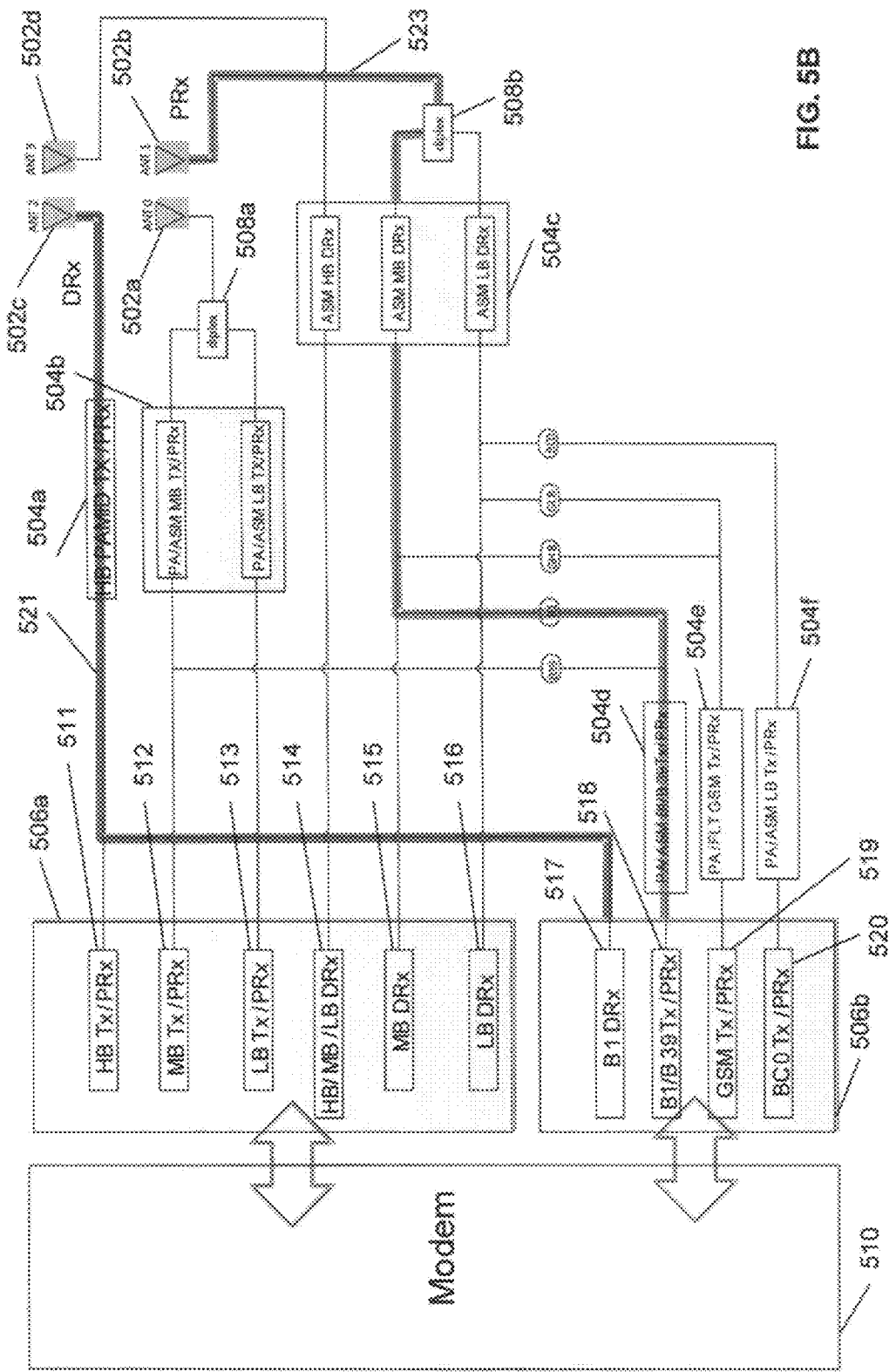

FIG. 5B illustrates other exemplary implementations of signal paths through a front-end of a UE 102 according to aspects of the present disclosure. The components of the UE 102 are the same as the components shown in FIG. 5A, and the descriptions of such components are not repeated here. In the exemplary implementations shown in FIG. 5B, one exemplary signal path (shown by the line 521) may be through antenna 502c, power amplifier and/or antenna switch 504a, multi-mode radio frequency transceiver 506b, and modem 510. Another exemplary signal path (shown by the line 523) may be through antenna 502b, diplexer 508b, power amplifier and/or antenna switch 504d, multi-mode radio frequency transceiver 506b, and modem 510. The path of a received signal can vary as it depends on the type of signal being received. As a result, the delay through the different components in the receive path can change, which can in turn affect the accuracy of RSTD measurements by UE 102 for OTDOA positioning. Thus, a more accurate positioning may be achieved when information for the internal RF delays of UE 102 is provided by UE 102 to the server (e.g. E-SMLC 110) for positioning applications.

Figure 6:
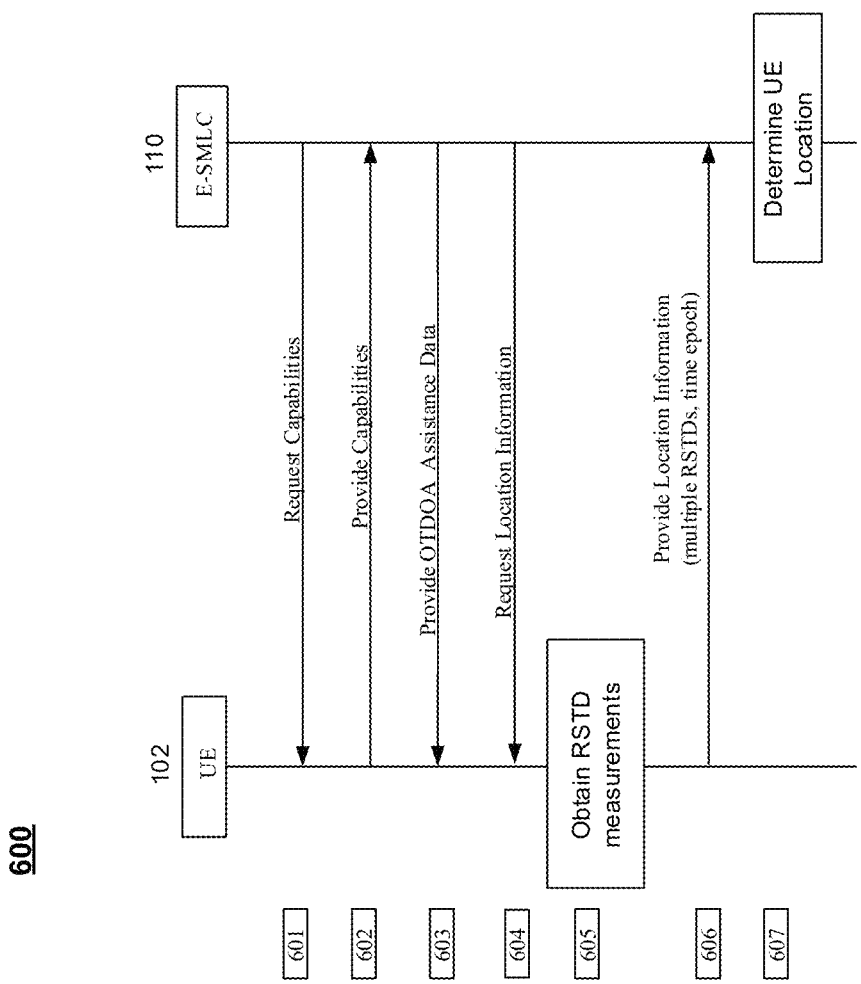
FIG. 6 illustrates an exemplary signaling flow of a procedure that supports OTDOA position determination according to aspects of the present disclosure.

FIG. 6 illustrates an exemplary signaling flow 600 of a procedure that supports OTDOA position determination according to aspects of the present disclosure. While signaling flow 600 is shown as occurring between UE 102 and E-SMLC 110 in network architecture 100, E-SMLC 110 could be replaced by another location server such as H-SLP 118 or an LMF in some embodiments. Signaling flow 600 may be instigated by the sending of a location request for UE 102 to E-SMLC 110 by some other entity (e.g. MME 108) which is not shown in FIG. 6.

At stage 601, E-SMLC 110 may transmit to UE 102 a Request Capabilities message (e.g. an LPP Request Capabilities message) to request the positioning capabilities of UE 102 such as the OTDOA positioning capabilities of UE 102. In response, at stage 602, the UE 102 sends a Provide Capabilities message (e.g. an LPP Provide Capabilities message) to the E-SMLC 110 to provide the positioning capabilities of UE 102. If OTDOA positioning capabilities were requested in stage 601, the Provide Capabilities message may include the OTDOA positioning capabilities of UE 102 such as the OTDOA modes supported by UE 102 (e.g. UE assisted OTDOA and/or UE based OTDOA), supported frequency bands, and support for inter-frequency RSTD measurements.

According to aspects of the present disclosure, the capabilities of the UE 102 sent at stage 602 may include information for a coverage enhancement level of UE 102. The information for the coverage enhancement (CE) level may include at least one of a transmission power level for UE 102, a number of repetitions of a message broadcast by a serving base station for UE 102 (e.g. eNB 104) and received and successfully decoded by UE 102 (e.g. as described for FIG. 3 and FIG. 4A), a number of repetitions of a message sent by UE 102 to a serving base station (e.g. eNB 104) (e.g. as described for FIG. 4B) where the message is acknowledged by the serving base station, or some combination thereof.

According to other aspects of the present disclosure, the capabilities of the UE 102 sent at stage 602 may include information for at least one internal signaling path of UE 102, such as an internal delay of the at least one internal signaling path. For example, UE 102 may determine the internal delay of the at least one internal signaling path based on at least one of a type of antenna, a type of transceiver, and/or a power amplifier or an antenna switch used by the at least one internal signaling path, as illustrated in FIGS. 5A and 5B.

At stage 603, the E-SMLC 110 may send a Provide Assistance Data message (e.g. an LPP Provide Assistance Data message) to the UE 102 with OTDOA assistance data. The OTDOA assistance data may include assistance data (AD) for a reference cell and assistance data for a number of neighbor cells. For example, the assistance data may include PRS configuration parameters defining PRS signals (or NPRS signals) transmitted by the reference cell and each neighbor cell (e.g. as described for FIGS. 2A and 2B). As described previously, E-SMLC 110 may provide a smaller amount of AD to UE 102 at stage 603 (e.g. may provide AD for fewer neighbor cells) if UE 102 indicates a higher CE level (e.g. CE level 2 or 3) at stage 602 in order to reduce the overall response time for locating UE 102. Conversely UE 102 may provide a larger amount of AD to UE 102 at stage 603 (e.g. may provide AD for a greater number of neighbor cells) if UE 102 indicates a lower CE level (e.g. CE level 0 or 1) at stage 602.

At stage 604, the E-SMLC 110 sends a Request Location Information message (e.g. an LPP Request Location Information message) to the UE 102 to request RSTD measurements for OTDOA positioning. This message may include information elements such as the location information type required (e.g. indicating RSTD measurements or a location estimate), a desired accuracy of a location estimate, and a response time interval (also referred to as a reporting time interval). As described previously, E-SMLC 110 may request a smaller number of location measurements from UE 102 at stage 604 (e.g. may request RSTD measurements for a smaller number of neighbor cells), may request a lower accuracy and/or may provide a higher response time interval if UE 102 indicates a higher CE level (e.g. CE level 2 or 3) at stage 602 in order to reduce the overall response time for locating UE 102. Conversely E-SMLC 110 may request a larger number of location measurements from UE 102 at stage 604 (e.g. may request RSTD measurements for more neighbor cells), may request a higher accuracy and/or may provide a smaller response time interval if UE 102 indicates a lower CE level (e.g. CE level 0 or 1) at stage 602

At stage 605, the UE 102 obtains the RSTD measurements using the provided assistance data. For example, UE 102 may use assistance data comprising PRS configuration parameters to help acquire and measure RSTDs for OTDOA reference and neighbor cells as described in association with FIGS. 2A and 2B.

At stage 606, and at or before the response time interval has expired, the UE 102 sends one or more RSTD measurements for each of for one or more neighbor cells in a Provide Location Information message (e.g. an LPP Provide Location Information message) to the E-SMLC 110.

At stage 607, the E-SMLC 110 uses the RSTD measurements provided by the UE 102 at stage 606 to determine the location of UE 102. For example, the E-SMLC 110 may use the known locations of the antennas for the reference and neighbor cells measured by the UE 102 at stage 605 as well as the measurement information received in stage 606 to determine the location.

In one aspect of signaling flow 600, denoted herein as aspect A1, UE 102 may determine a first response delay between a time of receiving the request capabilities message sent at stage 601 and a time of sending the provide capabilities message at stage 602. UE 102 may then include the first response delay in the provide capabilities message sent at stage 602, e.g. as part of information for the coverage enhancement level for UE 102. Since the provide capabilities message is not yet transmitted when UE 102 includes the first response delay in this message, UE 102 may determine the first response delay at the time the first response delay is included in the provide capabilities message or may estimate an additional delay for starting to transmit the provide capabilities message and include this additional delay as part of the first response delay. E-SMLC 110 may then measure a second response delay, where the second response delay comprises a difference between a time of sending the request capabilities message at stage 601 and a time of receiving the provide capabilities message sent at stage 602. E-SMLC 110 may then determine a round trip propagation time, RTTdet, as equal to the second response delay less the first response delay. E-SMLC 110 may then determine or estimate a CE level for UE 102 based on RTTdet and other information such as a known transmission bandwidth, BW, for the wireless access used by UE 102 (e.g. such as 180 KHz in the case of UE 102 with NB-IoT wireless access). For example, E-SMLC 110 can calculate a minimum RTT, RTTmin, as equal to (M1+M2)/BW, where M1 is the overall size (e.g. in bits) of the request capabilities message sent at stage 601 and M2 is the overall size (e.g. in bits) of the provide capabilities message sent at stage 602 (allowing for inclusion of other lower level protocol headers and possible use of segmentation over the wireless access for UE 102). If RTTdet is much higher than RTTmin (e.g. 20 times higher or more), E-SMLC 110 may determine a high CE level for UE 102 (e.g. CE level 2 or 3) whereas if RTTdet is higher than RTTmin by a smaller multiple, E-SMLC 110 may determine a smaller CE level (e.g. CE level 0 or 1). The exact ratio of RTTdet to RTTmin for different values of CE level may be refined by testing by the operator of E-SMLC 110 to determine ratios that are associated with known CE levels of tested UEs.

Figure 7:
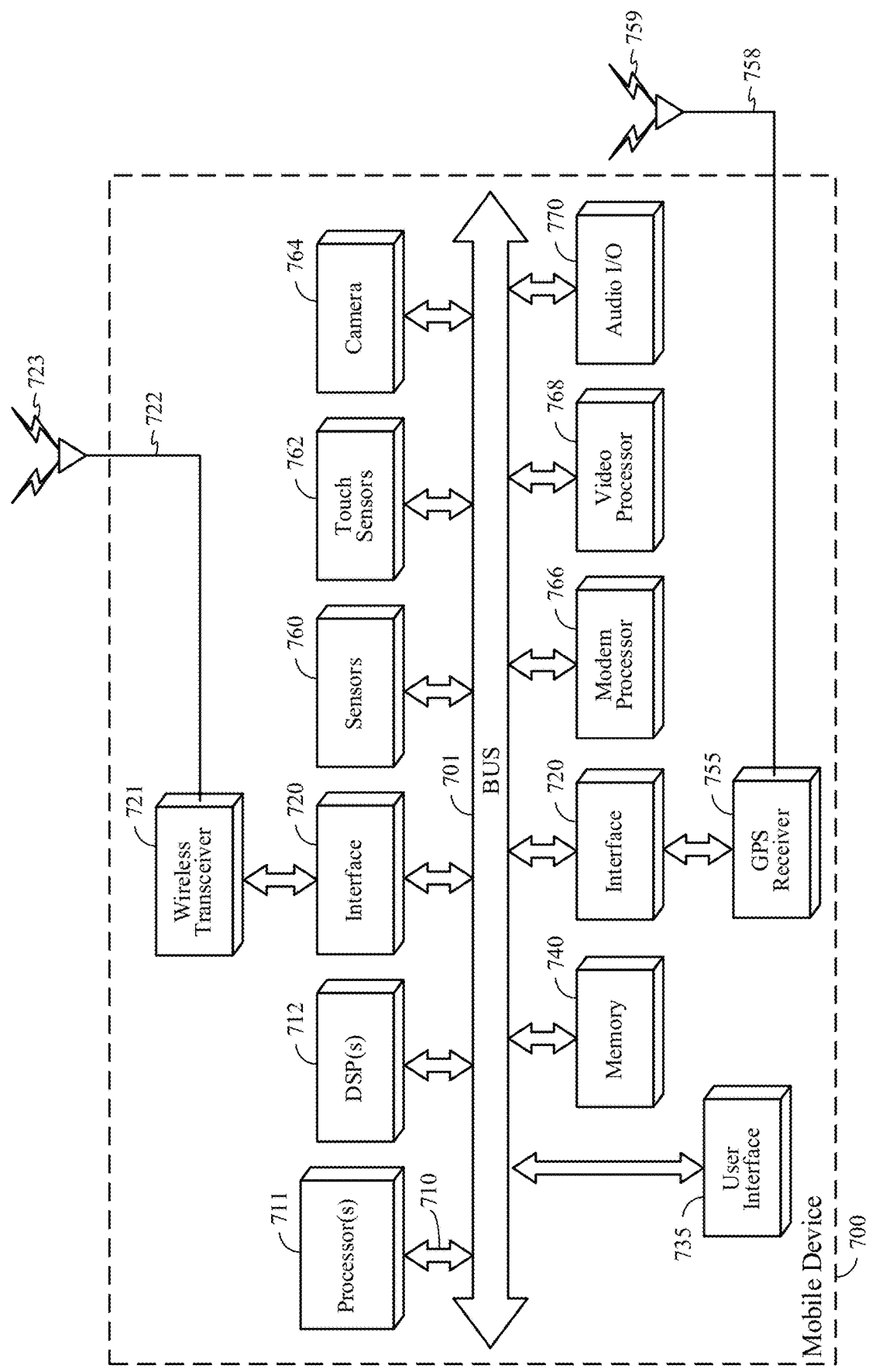
FIG. 7 illustrates an exemplary block diagram of a mobile device that may be configured to perform enhanced device capabilities exchange according to aspects of the present disclosure.

FIG. 7 illustrates an exemplary block diagram of a device that may be configured to perform enhanced device capabilities exchange in mobile positioning applications according to aspects of the present disclosure. A device that may be configured to perform enhanced device capabilities exchange in mobile positioning applications may comprise one or more features of mobile device 700 shown in FIG. 7. Mobile device 700 may correspond to UE 102 for FIGS. 1, 3, 4A, 4B, 5A, 5B and 6. In certain embodiments, mobile device 700 may include a wireless transceiver 721 that is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers similar to wireless transceiver 721 and multiple wireless antennas similar to wireless antenna 722 to enable transmitting and/or receiving signals according to a corresponding multiple wireless communication standards such as, for example, versions of Institute of Electrical and Electronics Engineers (IEEE) Std. 802.11, code-division multiple access (CDMA), wideband CDMA (WCDMA), LTE, universal mobile telecommunications service (UMTS), GSM, AMPS, ZigBee and Bluetooth®, etc.

Mobile device 700 may also comprise a Global Positioning System (GPS) receiver 755 capable of receiving and acquiring GPS signals 759 via GPS antenna 758 (which may be combined with antenna 722). GPS is one example of a GNSS, and it is understood that other satellite positioning systems may also be used. GPS receiver 755 may also process, in whole or in part, acquired GPS signals 759 for estimating a location of mobile device 700. In some embodiments, processor(s) 711 (which can include one or more processors executing instructions saved in memory), memory 740, digital signal processor(s) (DSP(s)) 712 and/or specialized processors (not shown) may also be utilized to process acquired GPS signals, in whole or in part, and/or calculate an estimated location of mobile device 700, in conjunction with GPS receiver 755. Storage of GPS or other signals may be performed in memory 740 or registers (not shown).

Also shown in FIG. 7, mobile device 700 may comprise digital signal processor(s) (DSP(s)) 712 connected to the bus 701, processor(s) 711 connected to the bus 701 and memory 740. A bus interface (not shown in FIG. 7) may be integrated with the DSP(s) 712, processor(s) 711 and memory 740 or may be separate. According to aspects of the present disclosure, processor(s) 711 and/or DSP(s) 712 may act as a controller of one or more components within the mobile device 700. In various embodiments, functions may be performed in response to execution of one or more machine-readable instructions stored in memory 740 such as on a computer-readable storage medium, such as RAM, ROM, FLASH, or disc drive, just to name a few examples. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless station. Processor(s) 711 and/or DSP(s) 712 may execute instructions to execute one or more aspects of processes/methods discussed in connection with FIG. 1 through FIG. 6 and FIG. 8 through FIG. 10, particularly FIGS. 3, 4A, 6, 8, 9 and 10.

Also shown in FIG. 7, a user interface 735 may comprise any one of several devices such as, for example, a speaker, microphone, display device, vibration device, keyboard, touch screen, etc. A user interface signal provided to a user may be one or more outputs provided by any of the speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or complementary metal-oxide-semiconductor imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or GPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figure 8:
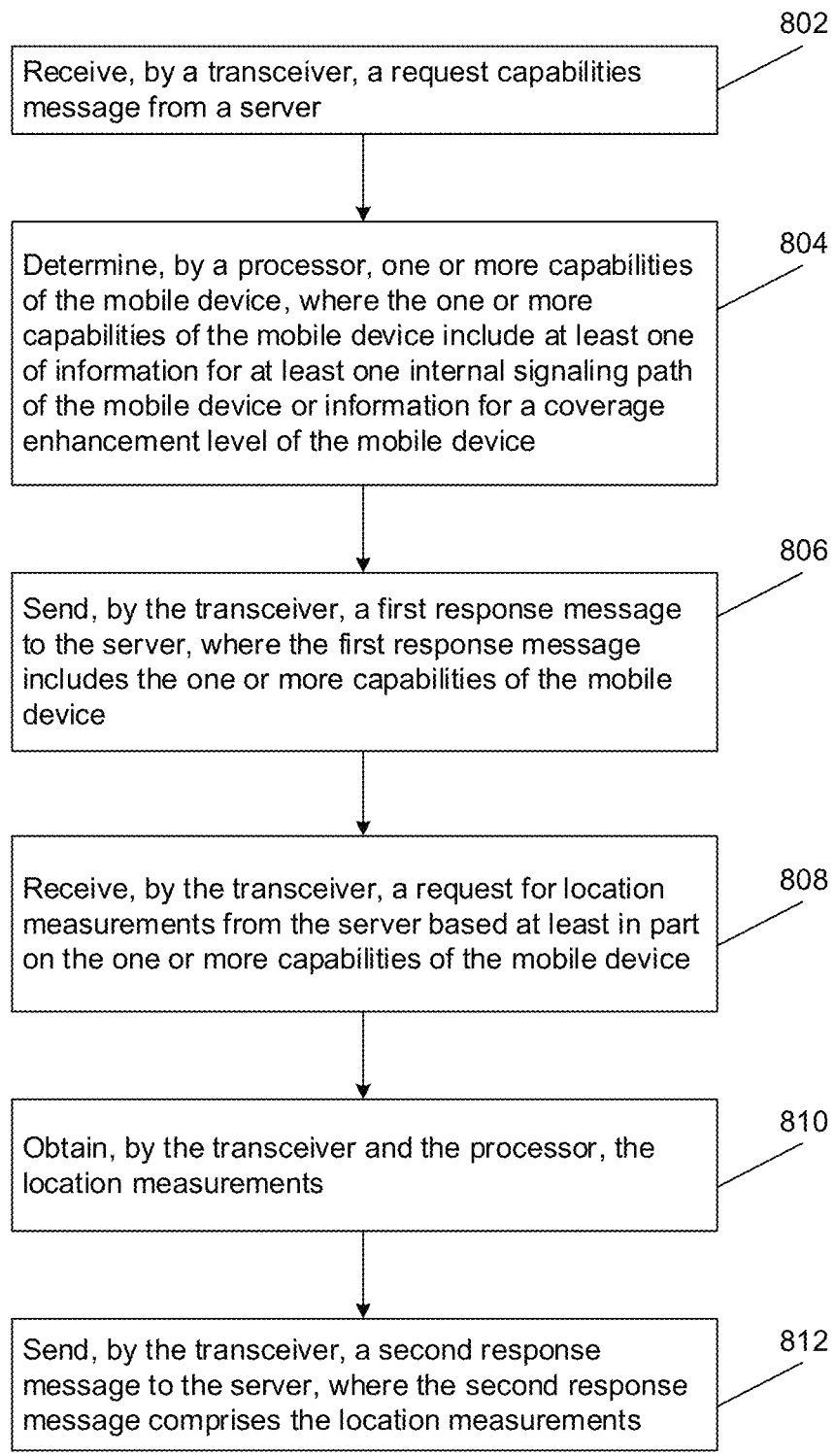
FIG. 8 illustrates an exemplary method of positioning a mobile device according to aspects of the present disclosure.

FIG. 8 illustrates an exemplary method of positioning a mobile device (e.g. the UE 102), performed generally at the mobile device, according to aspects of the present disclosure. As shown in FIG. 8, in block 802, the method receives, by a transceiver of the mobile device, a request capabilities message from a server (e.g. as at stage 601 in FIG. 6). The server may be an E-SMLC (e.g. E-SMLC 110), an SLP (e.g. H-SLP 118) or an LMF. In block 804, the method determines, by a processor of the mobile device, one or more capabilities of the mobile device, where the one or more capabilities of the mobile device include at least one of information for at least one internal signaling path of the mobile device or information for a coverage enhancement level of the mobile device. In block 806, the method sends, by the transceiver, a first response message to the server, where the first response message includes the one or more capabilities of the mobile device (e.g. as at stage 602 in FIG. 6). In block 808, the method receives, by the transceiver, a request for location measurements from the server based at least in part on the one or more capabilities of the mobile device (e.g. as at stage 604 in FIG. 6). In block 810, the method obtains, by the transceiver and the processor, the location measurements (e.g. as at stage 605 in FIG. 6). In block 812, the method sends, by the transceiver, a second response message to the server, where the second response message comprises the location measurements (e.g. as at stage 606 in FIG. 6). According to aspects of the present disclosure, the one or more capabilities of the mobile device include the information for the coverage enhancement level, where the request for location measurements is further based at least in part on the information for the coverage enhancement level (e.g. as described previously for stage 604 in FIG. 6).

In an aspect, the information for the at least one internal signaling path comprises an internal delay of the at least one internal signaling path. In this aspect, the method may further include determining, by the processor, the internal delay of the at least one internal signaling path based on at least one of a type of antenna, a transceiver, a power amplifier or an antenna switch used by the at least one internal signaling path (e.g. as described previously for stage 602 of FIG. 6).

In an aspect, and as described previously for FIGS. 3, 4A and 4B, the information for the coverage enhancement level determined at block 804 may comprise at least one of a transmission power level for the mobile device, a number of repetitions of a message broadcast by a serving base station and received and successfully decoded by the mobile device, a number of repetitions of a message sent by the mobile device to the serving base station where the message is acknowledged by the serving base station, or some combination thereof.

In some implementations, the method may further include receiving, by the transceiver, assistance data from the server based at least in part on the one or more capabilities of the mobile device (e.g. as at stage 603 in FIG. 6), and obtaining, by the transceiver and the processor, the location measurements at block 810, based at least in part on the assistance data (e.g. as described for stage 605 in FIG. 6).

According to aspects of the present disclosure, the location measurements may comprise measurements of a reference signal time difference (RSTD) for Observed Time Difference of Arrival (OTDOA) positioning. The mobile device may communicate with the server using Narrow Band Internet of Things (NB-IoT) wireless access.

Figure 9:
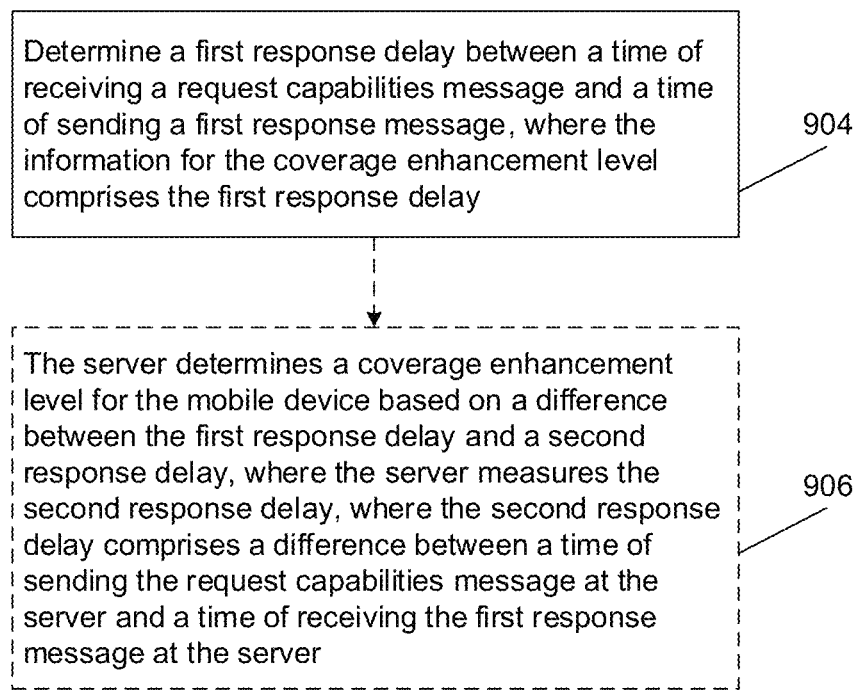
FIG. 9 illustrates an exemplary method of determining a coverage enhancement level of a mobile device according to aspects of the present disclosure.

FIG. 9 illustrates an exemplary method of determining a coverage enhancement level of a mobile device (e.g. UE 102), generally performed at the mobile device, according to aspects of the present disclosure. The method in FIG. 9 may be combined with the method in FIG. 8 (e.g. may extend the method in FIG. 8). As shown in FIG. 9, in block 904, the method determines a first response delay between a time of receiving a request capabilities message from a server (e.g. the request capabilities message received at block 802) and a time of sending a first response message to the server (e.g. the first response message sent at block 806), where the information for the coverage enhancement level comprises the first response delay. The method performed in block 904 may additionally or optionally include the approach shown in block 906. In block 906, the server determines a coverage enhancement level for the mobile device based on a difference between the first response delay and a second response delay, where the server measures the second response delay, where the second response delay comprises a difference between a time of sending the request capabilities message at the server and a time of receiving the first response message at the server. Blocks 904 and 906 may correspond to aspect A1 described previously for FIG. 6.

Figure 10A:
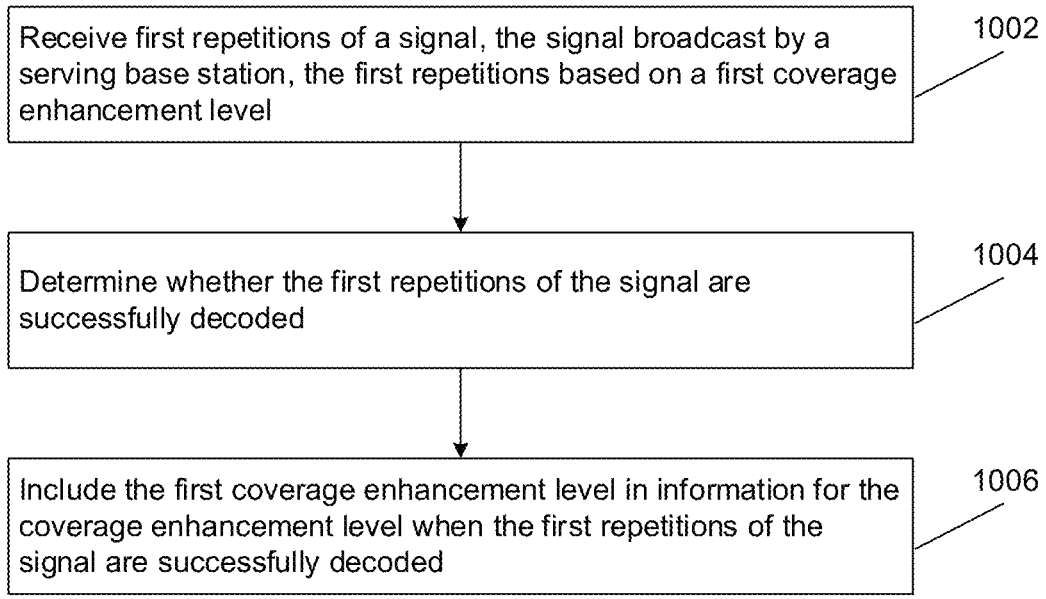
FIGS. 10A and 10B illustrate exemplary methods of determining information for a coverage enhancement level of a mobile device according to aspects of the present disclosure.

FIG. 10A illustrates an exemplary implementation of a method of determining information for a coverage enhancement level of a mobile device (e.g. UE 102), generally performed at the mobile device, according to aspects of the present disclosure. The method in FIG. 10A may be combined with the method in FIG. 8 (e.g. may extend the method in FIG. 8). In the example shown in FIG. 10A, in block 1002, the method receives first repetitions of a signal, where the signal is broadcast by a serving base station, and where the first repetitions are based on a first coverage enhancement level. In block 1004, the method determines whether the first repetitions of the signal are successfully decoded. In block 1006, the method includes the first coverage enhancement level in information for the coverage enhancement level (e.g. as at blocks 804 and 806 for the method in FIG. 8) when the first repetitions of the signal are successfully decoded. Blocks 1002, 1004 and 1006 may correspond to parts of procedure 300 and/or procedure 400 as described in association with FIG. 3 and FIG. 4A.

Figure 10B:
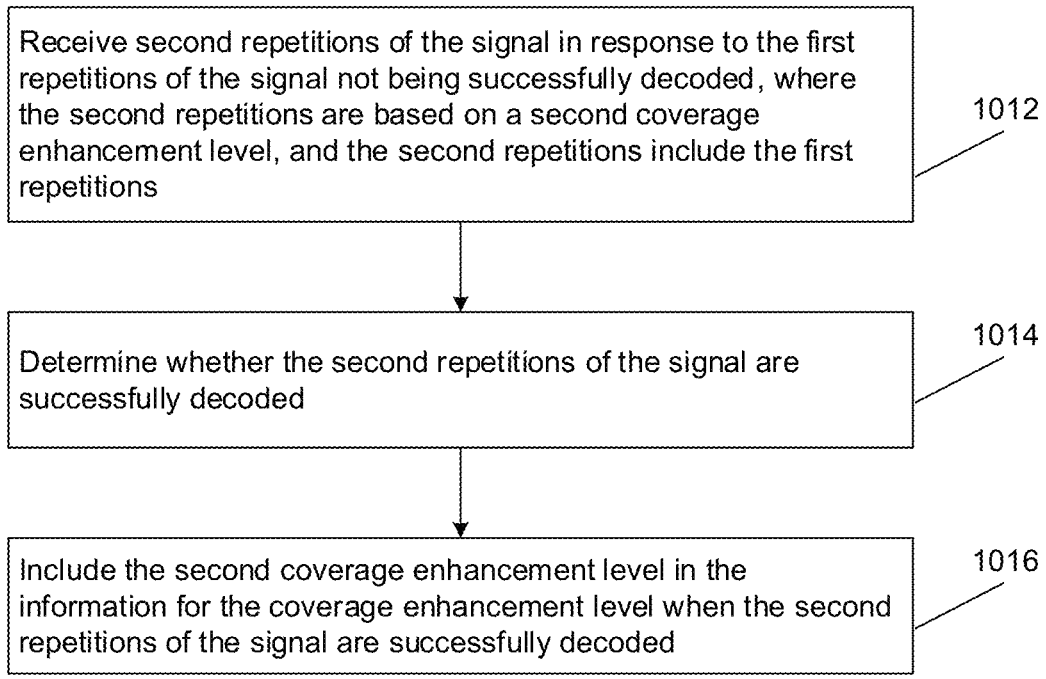

According to aspects of the present disclosure, the method performed in FIG. 10A may additionally or optionally include the method performed in FIG. 10B. As shown in FIG. 10B, in block 1012, the method receives second repetitions of the signal in response to the first repetitions of the signal not being successfully decoded at block 1004, where the second repetitions are based on a second coverage enhancement level, and where the second repetitions include the first repetitions. In block 1014, the method determines whether the second repetitions of the signal are successfully decoded. In block 1016, the method includes the second coverage enhancement level in the information for the coverage enhancement level when the second repetitions of the signal are successfully decoded. Blocks 1012, 1014 and 1016 may correspond to parts of procedure 300 and/or procedure 400 as described in association with FIG. 3 and FIG. 4A.

Figure 11A:
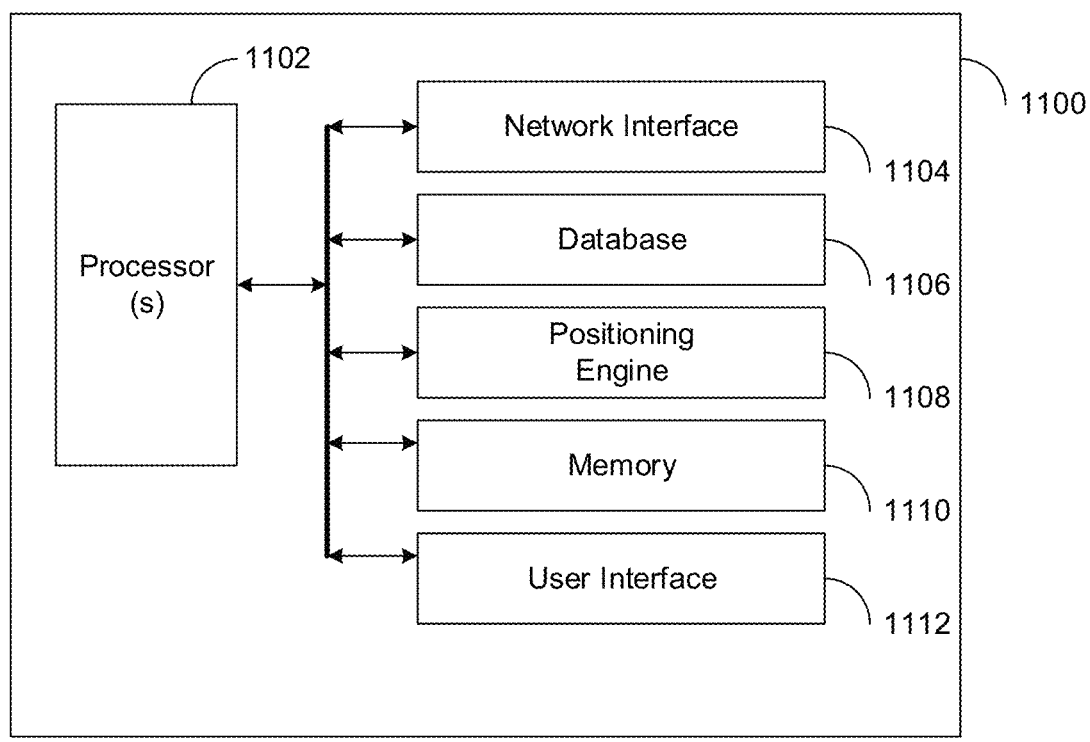
FIG. 11A illustrates an exemplary apparatus for positioning of a mobile device using enhanced exchange of capabilities according to aspects of the present disclosure.

FIG. 11A illustrates an exemplary apparatus for positioning of a mobile device (e.g. a UE 102) using enhanced exchange of capabilities according to aspects of the present disclosure. Apparatus 1100 may correspond to or represent any of E-SMLC 110, H-SLP 118 or an LMF. In the example shown in FIG. 11A, apparatus 1100 may include one or more processors 1102, network interface 1104, database 1106, positioning engine 1108, memory 1110, and user interface 1112. The one or more processors 1102 can be configured to control operations of the apparatus 1100. The network interface 1104 can be configured to communicate with a network (as described in association with FIG. 1) and with servers, computers, and/or mobile devices on the network or accessible via the network using one or more transceivers (transmitters and receivers) that may be part of network interface 1104. Database 1106 can be configured to store positioning assistance data, sensor measurements, user interface inputs, positioning estimations, images, encoding and decoding information and other information related to support of one or more positioning protocols and/or one or more position methods. The one or more processors 1102 and/or the positioning engine 1108 can be configured to implement methods to support and communicate using one or more positioning protocols. For example, working with the processor(s) 1102, the positioning engine 1108 can be configured to implement positioning protocols described in association with FIG. 1 and FIG. 6. In some implementations, positioning engine 1108 may include dedicated hardware whereas in other implementations positioning engine 1108 may be a process, program, part of a process or program or other software or firmware running on processor(s) 1102 and possibly running according to code stored in memory 1110.

Memory 1110 can be configured to store program codes, instructions, and data for the apparatus 1100—e.g. data to support positioning protocols and/or position methods according to the exemplary methods described here in association with FIG. 1, FIG. 3, FIGS. 4A-4B and FIG. 6. User interface 1112 may be configured to enable interactions between apparatus 1100 and a user. According to aspects of the present disclosure, the apparatus 1100 may be implemented as a part of a server. In that implementation, the positioning protocols and/or position methods may be used by the server and/or may be communicated to mobile devices (e.g. UE 102) via the network interface 1104. These implementations or any combinations thereof are within the scope of the present disclosure.

Figure 11B:
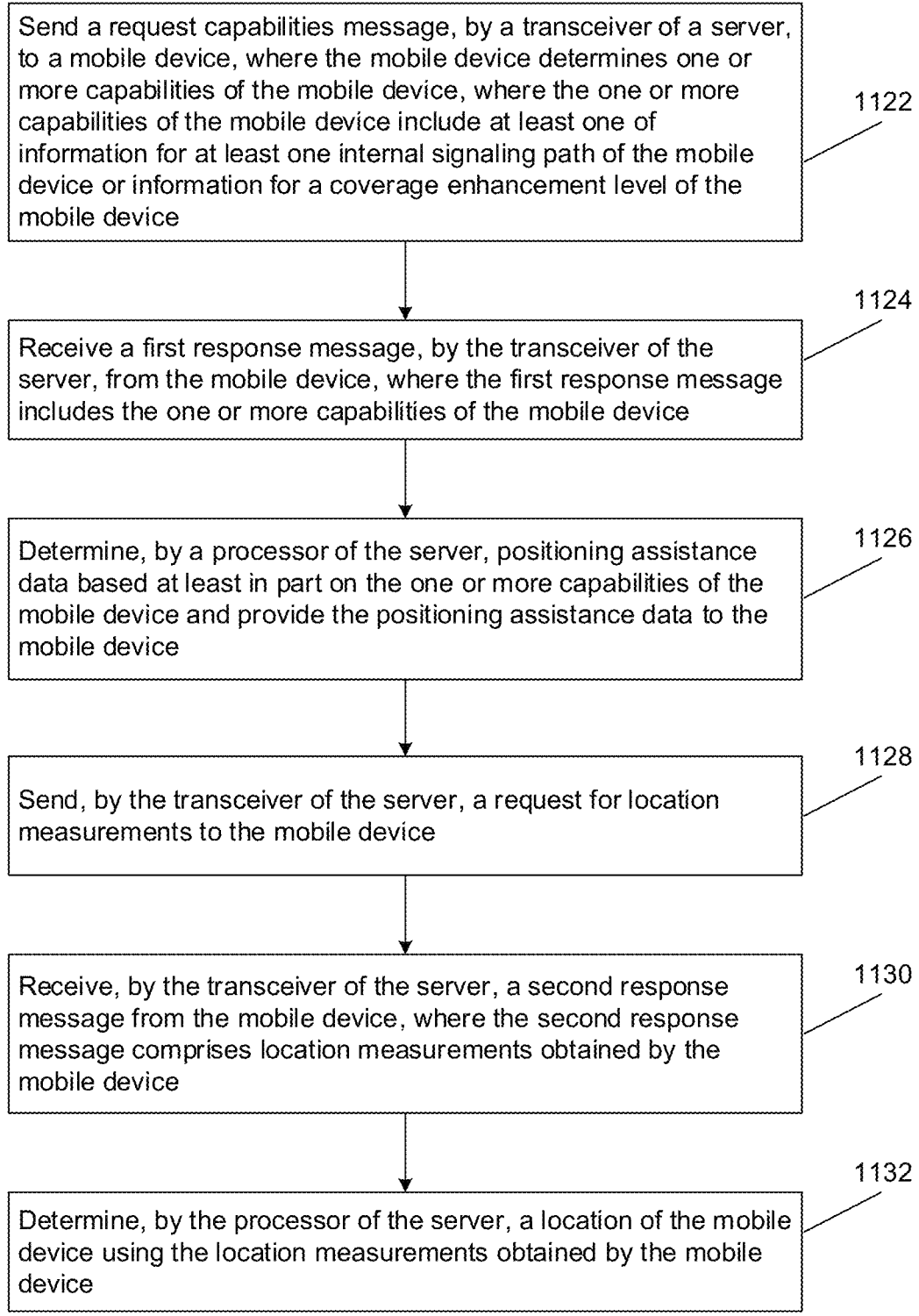
FIG. 11B illustrates an exemplary implementation of positioning of a mobile device using an enhanced exchange of capabilities of the mobile device according to aspects of the present disclosure.

FIG. 11B illustrates an exemplary implementation of positioning of a mobile device (e.g. the UE 102), generally performed by a server, using an enhanced exchange of capabilities of the mobile device according to aspects of the present disclosure. The exemplary implementation in FIG. 11B may be performed by an E-SMLC (e.g. E-SMLC 110), an SLP (e.g. H-SLP 118), an LMF, or the apparatus 1100. As shown in FIG. 11B, in block 1122, the method sends a request capabilities message, by a transceiver of the server, to a mobile device (e.g. as at stage 601 in FIG. 6), where the mobile device determines one or more capabilities of the mobile device, and where the one or more capabilities of the mobile device include at least one of information for at least one internal signaling path of the mobile device or information for a coverage enhancement level of the mobile device. In block 1124, the method receives a first response message, by the transceiver of the server, from the mobile device, where the first response message includes the one or more capabilities of the mobile device (e.g. as at stage 602 in FIG. 6). In block 1126, the method determines, by a processor of the server, positioning assistance data based at least in part on the one or more capabilities of the mobile device and provides the positioning assistance data to the mobile device (e.g. as at stage 603 in FIG. 6). In block 1128, the method sends, by the transceiver of the server, a request for location measurements to the mobile device (e.g. as at stage 604 in FIG. 6). In block 1130, the method receives, by the transceiver of the server, a second response message from the mobile device, where the second response message comprises location measurements obtained by the mobile device (e.g. as at stage 606 in FIG. 6). In block 1132, the method determines, by the processor of the server, a location of the mobile device using the location measurements obtained by the mobile device (e.g. as at stage 607 in FIG. 6).

According to aspects of the present disclosure, the one or more capabilities of the mobile device may include the information for the coverage enhancement level, where the request for location measurements is further based at least in part on the information for the coverage enhancement level. The information for the at least one internal signaling path may comprises an internal delay of the at least one internal signaling path in the mobile device. The information for the coverage enhancement level may include at least one of a transmission power level for the mobile device, a number of repetitions of a message broadcast by a serving base station and received and successfully decoded by the mobile device, a number of repetitions of a message sent by the mobile device to the serving base station where the message is acknowledged by the serving base station, or some combination thereof. The location measurements may include measurements of a reference signal time difference (RSTD) for Observed Time Difference of Arrival (OTDOA) positioning. The server may communicate with the mobile device using Narrow Band Internet of Things (NB-IoT) wireless access for the mobile device.

In some implementations, the mobile device may further configured to determine the internal delay of the at least one internal signaling path based on at least one of a type of antenna, a transceiver, a power amplifier or an antenna switch used by the at least one internal signaling path of the mobile device.

In some implementations and as described for aspect A1 for FIG. 6, the mobile device may further be configured to determine a first response delay between a time of receiving the request capabilities message and a time of sending the first response message, where the information for the coverage enhancement level comprises the first response delay. The server may further be configured to determine a coverage enhancement level for the mobile device based on a difference between the first response delay and a second response delay, where the server measures the second response delay, and where the second response delay comprises a difference between a time of sending the request capabilities message at the server and a time of receiving the first response message at the server.

According to aspects of the present disclosure and as described for FIG. 3 and FIG. 4A, determining the information for the coverage enhancement level by the mobile device may include receiving by the mobile device first repetitions of a signal, the signal broadcast by a serving base station, where the first repetitions are based on a first coverage enhancement level, determining whether the first repetitions of the signal are successfully decoded, and including the first coverage enhancement level in the information for the coverage enhancement level when the first repetitions of the signal are successfully decoded.

Determining the information for the coverage enhancement level by the mobile device may further include in response to the first repetitions of the signal not being successfully decoded by the mobile device, receiving second repetitions of the signal, the second repetitions based on a second coverage enhancement level, the second repetitions including the first repetitions, determining whether the second repetitions of the signal are successfully decoded, and including the second coverage enhancement level in the information for the coverage enhancement level when the second repetitions of the signal are successfully decoded by the mobile device.

The server may further be configured to send assistance data to the mobile device based at least in part on the one or more capabilities of the mobile device, where the mobile device then obtains the location measurements based at least in part on the assistance data.

Note that FIG. 1 through FIGS. 11A-11B and their corresponding descriptions provide, or make use of, means at a mobile device for receiving a request capabilities message from a server; means for determining one or more capabilities of the mobile device; means for sending a first response message to the server; means for receiving a request for location measurements from the server based at least in part on the one or more capabilities of the mobile device; means for obtaining the location measurements; means for sending a second response message to the server; means for determining a delay of an internal signal path; means for determining a coverage enhancement level of the mobile device; means for receiving a first signal; means for determining whether the first signal is successfully decoded using a first coverage enhancement level; means for communicating using the first coverage enhancement level in response to the first signal being successfully decoded; means for receiving a second signal in response to the first signal not being successfully decoded; means for determining whether the second signal is successfully decoded using a second coverage enhancement level; means for communicating using the second coverage enhancement level in response to the second signal being successfully decoded; and means for repeating the above process with a subsequent signal and a subsequent coverage enhancement level until the subsequent signal is successfully decoded using the subsequent coverage enhancement level.

The methodologies described herein may be implemented by various means depending upon applications according to particular examples. For example, such methodologies may be implemented in hardware, firmware, and software. In a hardware implementation, for example, a processing unit may be implemented within one or more application specific integrated circuits (ASICs), DSPs, digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a CDMA network, a Time Division Multiple Access (TDMA) network, a Frequency Division Multiple Access (FDMA) network, an Orthogonal FDMA (OFDMA) network, a Single-Carrier FDMA (SC-FDMA) network, or any combination of the above networks, and so on. A CDMA network may implement one or more RATs such as cdma2000, Wideband CDMA (W-CDMA), to name just a few radio technologies. Here, cdma2000 may include technologies implemented according to IS-95, IS-2000, and IS-856 standards. A TDMA network may implement GSM, Digital Advanced Mobile Phone System ("D-AMPS"), or some other RAT. GSM and W-CDMA are described in documents from 3GPP. Cdma2000 is described in documents from 3GPP2. 3GPP and 3GPP2 documents are publicly available. 4G LTE and 5G NR communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Techniques described herein may be used with a GNSS that includes any one of several GNSS and/or combinations of GNSS. Furthermore, such techniques may be used with positioning systems that utilize terrestrial transmitters acting as "pseudolites", or a combination of space vehicles (SVs) and such terrestrial transmitters. Terrestrial transmitters may, for example, include ground-based transmitters that broadcast a pseudorandom noise (PN) code or other ranging code (e.g., similar to a GPS or CDMA cellular signal). Such a transmitter may be assigned a unique PN code so as to permit identification by a remote receiver. Terrestrial transmitters may be useful, for example, to augment a GNSS in situations where GNSS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "GNSS signals" and/or "SV signals", as used herein, is intended to include GNSS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of positioning by a mobile device, comprising:

receiving, by a transceiver, a request capabilities message from a server;

determining, by a processor, one or more capabilities of the mobile device, wherein the one or more capabilities of the mobile device include at least one of information for at least one internal signaling path of the mobile device or information for a coverage enhancement level of the mobile device, and wherein determining one or more capabilities of the mobile device comprises determining an internal signaling path from a plurality of internal signaling paths of the mobile device based on a type of signal received, wherein the internal signaling path includes a type of antenna used to receive the type of signal, and the information for the at least one internal signaling path comprises an internal delay of the at least one internal signaling path;

sending, by the transceiver, a first response message to the server, wherein the first response message includes the one or more capabilities of the mobile device;

receiving, by the transceiver, a request for location measurements from the server based at least in part on the one or more capabilities of the mobile device;

obtaining, by the transceiver and the processor, the location measurements; and sending, by the transceiver, a second response message to the server, wherein the second response message comprises the location measurements.

2. The method of claim 1, wherein the one or more capabilities of the mobile device include the information for the coverage enhancement level, wherein the request for location measurements is further based at least in part on the information for the coverage enhancement level.

3. The method of claim 1, further comprising determining the internal delay of the at least one internal signaling path based on at least one of a transceiver, a power amplifier or an antenna switch used by the at least one internal signaling path.

4. The method of claim 1, further comprising determining a first response delay between a time of receiving the request capabilities message and a time of sending the first response message, wherein the information for the coverage enhancement level comprises the first response delay.

5. The method of claim 4, wherein the server determines a coverage enhancement level for the mobile device based on a difference between the first response delay and a second response delay, wherein the server measures the second response delay, wherein the second response delay comprises a difference between a time of sending the request capabilities message at the server and a time of receiving the first response message at the server.

6. The method of claim 1, wherein the information for the coverage enhancement level comprises at least one of:

a transmission power level for the mobile device;

a number of repetitions of a message broadcast by a serving base station and received and successfully decoded by the mobile device;

a number of repetitions of a message sent by the mobile device to the serving base station, the message acknowledged by the serving base station;

or some combination thereof.

7. The method of claim 1, wherein determining the information for the coverage enhancement level comprises:

receiving first repetitions of a signal, the signal broadcast by a serving base station, the first repetitions based on a first coverage enhancement level;

determining whether the first repetitions of the signal are successfully decoded; and including the first coverage enhancement level in the information for the coverage enhancement level when the first repetitions of the signal are successfully decoded.

8. The method of claim 7, further comprising:
in response to the first repetitions of the signal not being successfully decoded, receiving second repetitions of the signal, the second repetitions based on a second coverage enhancement level, the second repetitions including the first repetitions;
determining whether the second repetitions of the signal are successfully decoded; and
including the second coverage enhancement level in the information for the coverage enhancement level when the second repetitions of the signal are successfully decoded.

9. The method of claim 1, further comprising:
receiving, by the transceiver, assistance data from the server based at least in part on the one or more capabilities of the mobile device; and
obtaining, by the transceiver and the processor, the location measurements, based at least in part on the assistance data.

10. The method of claim 1, wherein the location measurements comprise measurements of a reference signal time difference (RSTD) for Observed Time Difference of Arrival (OTDOA) positioning.

11. The method of claim 1, wherein the mobile device communicates with the server using Narrow Band Internet of Things (NB-IoT) wireless access.

12. The method of claim 11, wherein the server is an Enhanced Serving Mobile Location Center (E-SMLC), a Secure User Plane Location (SUPL) Location Platform (SLP), or a Location Management Function (LMF).

13. A mobile device, comprising:
a transceiver configured to receive a request capabilities message from a server;
a processor configured to determine one or more capabilities of the mobile device, wherein the one or more capabilities of the mobile device include at least one of information for at least one internal signaling path of the mobile device or information for a coverage enhancement level of the mobile device, and wherein determine one or more capabilities of the mobile device comprises determine an internal signaling path from a plurality of internal signaling paths of the mobile device based on a type of signal received, wherein the internal signaling path includes a type of antenna used to receive the type of signal, and the information for the at least one internal signaling path comprises an internal delay of the at least one internal signaling path;
the transceiver is further configured to
send a first response message to the server, wherein the first response message includes the one or more capabilities of the mobile device, and
receive a request for location measurements from the server based at least in part on the one or more capabilities of the mobile device;
the processor is further configured to obtain the location measurements; and
the transceiver is further configured to send a second response message to the server, wherein the second response message comprises the location measurements.

14. The mobile device of claim 13, wherein the one or more capabilities of the mobile device include the information for the coverage enhancement level, wherein the request for location measurements is further based at least in part on the information for the coverage enhancement level.

15. The mobile device of claim 13, wherein the processor is further configured to determine the internal delay of the at least one internal signaling path based on at least one of a transceiver, a power amplifier or an antenna switch used by the at least one internal signaling path.

16. The mobile device of claim 13, wherein the processor is further configured to determine a first response delay between a time of receiving the request capabilities message and a time of sending the first response message, wherein the information for the coverage enhancement level comprises the first response delay.

17. The mobile device of claim 16, wherein the server determines a coverage enhancement level for the mobile device based on a difference between the first response delay and a second response delay, wherein the server measures the second response delay, wherein the second response delay comprises a difference between a time of sending the request capabilities message at the server and a time of receiving the first response message at the server.

18. The mobile device of claim 13, wherein the information for the coverage enhancement level comprises at least one of:
a transmission power level for the mobile device;
a number of repetitions of a message broadcast by a serving base station and received and successfully decoded by the mobile device;
a number of repetitions of a message sent by the mobile device to the serving base station, the message acknowledged by the serving base station;
or some combinations thereof.

19. The mobile device of claim 13, wherein the processor is further configured to:
receive first repetitions of a signal, the signal broadcast by a serving base station, the first repetitions based on a first coverage enhancement level;
determine whether the first repetitions of the signal are successfully decoded; and
include the first coverage enhancement level in the information for the coverage enhancement level when the first repetitions of the signal are successfully decoded.

20. The mobile device of claim 19, wherein the processor is further configured to:
in response to the first repetitions of the signal not being successfully decoded, receive second repetitions of the signal, the second repetitions based on a second coverage enhancement level, the second repetitions including the first repetitions;
determine whether the second repetitions of the signal are successfully decoded; and
include the second coverage enhancement level in the information for the coverage enhancement level when the second repetitions of the signal are successfully decoded.

21. The mobile device of claim 13, wherein
the transceiver is further configured to receive assistance data from the server based at least in part on the one or more capabilities of the mobile device; and
the transceiver and the processor are further configured to obtain the location measurements, based at least in part on the assistance data.

22. The mobile device of claim 13, wherein the location measurements comprise measurements of a reference signal time difference (RSTD) for Observed Time Difference of Arrival (OTDOA) positioning.

23. The mobile device of claim 13, wherein the mobile device communicates with the server using Narrow Band Internet of Things (NB-IoT) wireless access.

24. The mobile device of claim 23, wherein the server is an Enhanced Serving Mobile Location Center (E-SMLC), a Secure User Plane Location (SUPL) Location Platform (SLP), or a Location Management Function (LMF).

25. A non-transitory medium storing instructions for execution by one or more processors of a mobile device, the instructions comprising:
- instructions for receiving a request capabilities message from a server;
- instructions for determining one or more capabilities of the mobile device, wherein the one or more capabilities of the mobile device include at least one of information for at least one internal signaling path of the mobile device or information for a coverage enhancement level of the mobile device, and wherein the instructions for determining one or more capabilities of the mobile device comprises instructions for determining an internal signaling path from a plurality of internal signaling paths of the mobile device based on a type of signal received, wherein the internal signaling path includes a type of antenna used to receive the type of signal, and the information for the at least one internal signaling path comprises an internal delay of the at least one internal signaling path;
- instructions for sending a first response message to the server, wherein the first response message includes the one or more capabilities of the mobile device;
- instructions for receiving a request for location measurements from the server based at least in part on the one or more capabilities of the mobile device;
- instructions for obtaining the location measurements; and
- instructions for sending a second response message to the server, wherein the second response message comprises the location measurements.

26. The non-transitory medium of claim 25, wherein the one or more capabilities of the mobile device include the information for the coverage enhancement level, wherein the request for location measurements is further based at least in part on the information for the coverage enhancement level.

27. The non-transitory medium of claim 25, further comprising instructions for determining the internal delay of the at least one internal signaling path based on at least one of a transceiver, a power amplifier or an antenna switch used by the at least one internal signaling path.

28. The non-transitory medium of claim 25, further comprising instructions for determining a first response delay between a time of receiving the request capabilities message and a time of sending the first response message, wherein the information for the coverage enhancement level comprises the first response delay.

29. The non-transitory medium of claim 28, wherein the server determines a coverage enhancement level for the mobile device based on a difference between the first response delay and a second response delay, wherein the server measures the second response delay, wherein the second response delay comprises a difference between a time of sending the request capabilities message at the server and a time of receiving the first response message at the server.

30. The non-transitory medium of claim 25, wherein the information for the coverage enhancement level comprises at least one of:
- a transmission power level for the mobile device;
- a number of repetitions of a message broadcast by a serving base station and received and successfully decoded by the mobile device;
- a number of repetitions of a message sent by the mobile device to the serving base station, the message acknowledged by the serving base station;
- or some combinations thereof.

31. The non-transitory medium of claim 25, wherein instructions for determining the information for the coverage enhancement level comprises:
- instructions for receiving first repetitions of a signal, the signal broadcast by a serving base station, the first repetitions based on a first coverage enhancement level;
- instructions for determining whether the first repetitions of the signal are successfully decoded; and
- instructions for including the first coverage enhancement level in the information for the coverage enhancement level when the first repetitions of the signal are successfully decoded.

32. The non-transitory medium of claim 31, further comprising:
- in response to the first repetitions of the signal not being successfully decoded, instructions for receiving second repetitions of the signal, the second repetitions based on a second coverage enhancement level, the second repetitions including the first repetitions;
- instructions for determining whether the second repetitions of the signal are successfully decoded; and
- instructions for including the second coverage enhancement level in the information for the coverage enhancement level when the second repetitions of the signal are successfully decoded.

33. The non-transitory medium of claim 25, further comprising:
- instructions for receiving assistance data from the server based at least in part on the one or more capabilities of the mobile device; and
- instructions for obtaining the location measurements, based at least in part on the assistance data.

34. The non-transitory medium of claim 25, wherein the location measurements comprise measurements of a reference signal time difference for Observed Time Difference of Arrival (OTDOA) positioning.

35. The non-transitory medium of claim 25, wherein the mobile device communicates with the server using Narrow Band Internet of Things (NB-IoT) wireless access.

36. The non-transitory medium of claim 35, wherein the server is an Enhanced Serving Mobile Location Center (E-SMLC), a Secure User Plane Location (SUPL) Location Platform (SLP), or a Location Management Function (LMF).

37. A mobile device, comprising:
- a transceiver means for receiving a request capabilities message from a server;
- a processor means for determining one or more capabilities of the mobile device, wherein the one or more capabilities of the mobile device include at least one of information for at least one internal signaling path of the mobile device or information for a coverage enhancement level of the mobile device, and wherein the processor means for determining one or more capabilities of the mobile device is further configured to determine an internal signaling path from a plurality of internal signaling paths of the mobile device based on a type of signal received, wherein the internal signaling path includes a type of antenna used to receive the type of signal, and the information for the at least one internal signaling path comprises an internal delay of the at least one internal signaling path;

the transceiver means for sending a first response message to the server, wherein the first response message includes the one or more capabilities of the mobile device;

the transceiver means for receiving a request for location measurements from the server based at least in part on the one or more capabilities of the mobile device;

the transceiver means and the processor means for obtaining the location measurements; and the transceiver means for sending a second response message to the server, wherein the second response message comprises the location measurements.

* * * * *